US 6,574,174 B1

(12) United States Patent
Amble et al.

(10) Patent No.: US 6,574,174 B1
(45) Date of Patent: Jun. 3, 2003

(54) OPTICAL DATA STORAGE SYSTEM WITH MULTIPLE LAYER MEDIA

(75) Inventors: James R. Amble, Redwood City, CA (US); Lambrerrtus Hesselink, Atherton, CA (US); Tokyuki Honda, Mountain View, CA (US); Mark E. McDonald, Milpitas, CA (US); Michael V. Morelli, San Jose, CA (US); Andrew J. Daiber, Palo Alto, CA (US); Herman A. Ferrier, Scotts Valley, CA (US); Sanjoy Ghose, Scotts Valley, CA (US); Thomas A. Kridl, Los Altos, CA (US); Matthew Lipson, Sunnyvale, CA (US); Shunichi Nishimura, Tokyo (JP); Sergei Sochava, Sunnyvale, CA (US); LeRoy A. Volz, San Jose, CA (US)

(73) Assignee: Siros Technologies, Inc., Davis, CA (US)

( * ) Notice: Subject to any disclaimer, the term of this patent is extended or adjusted under 35 U.S.C. 154(b) by 0 days.

(21) Appl. No.: 09/549,075

(22) Filed: Apr. 15, 2000

(51) Int. Cl.[7] .................................................. G11B 7/00
(52) U.S. Cl. .............................. 369/44.26; 369/44.37; 369/94
(58) Field of Search ................................ 369/94, 44.23, 369/44.26, 13.38, 13.39, 13.4, 13.41, 13.42, 275.1, 275.3, 112.22, 118, 44.24

(56) References Cited

U.S. PATENT DOCUMENTS

| 5,202,875 A | * | 4/1993 | Rosen et al. ............. 369/112.2 |
| 5,408,453 A | | 4/1995 | Holtslag et al. ......... 369/44.23 |
| 5,677,903 A | | 10/1997 | Holtslag et al. ............ 369/112 |
| 5,841,753 A | | 11/1998 | Holtslag et al. ............... 369/94 |
| 5,872,767 A | * | 2/1999 | Nagai et al. ............. 369/275.3 |
| 6,027,594 A | | 2/2000 | Nishiuchi et al. ........... 156/182 |

FOREIGN PATENT DOCUMENTS

EP           0825591         2/1998       ..................... 7/7

OTHER PUBLICATIONS

Kawamata et al. "K–M–S (keep–molecules sputtering) deposition of optical $MgF_2$ thin films" © 1998.

* cited by examiner

Primary Examiner—Thang V. Tran
(74) Attorney, Agent, or Firm—Sierra Patent Group, Ltd.

(57) ABSTRACT

An optical information storage system using optical storage media including multiple data layers or stacks wherein each of the multiple data stacks has a storage density comparable to a conventional single layer optical disk. The optical data storage system comprises an optical medium having a single dedicated servo layer and multiple data stacks which each contain an embedded servo format, a servo laser beam positioned to maintain a first focus point on the dedicated servo reference layer, a read-write laser beam positioned to maintain a second focus point on one of the data stacks, a first, dedicated servo system which provides focus and tracking error correction according to error signals generated from the dedicated servo layer, and a second, embedded servo system which provides focus and tracking error correction according to error signals generated from the data stacks. The dedicated servo layer, in different embodiments of the invention, may be positioned either below or above the data stacks in the optical medium, or interposed between data stacks. The data stacks may comprise discrete physical data layers or "virtual" data layers defined by a format hologram. The servo and read-write lasers may differ in wavelength and/or polarization.

25 Claims, 26 Drawing Sheets

Optical properties @658(%)   Remaining Heat dissipated, mW   Target has Signal Reflectivity*(%)
Amorphous Crystalline (1:3) Mean Power, mW   Amorphous Crystalline   Amorphous Crystalline Contrast

|  |  | Amorphous | Crystalline | (1:3) Mean | Mean Power, mW | Amorphous | Crystalline | Amorphous | Crystalline | Contrast |
|---|---|---|---|---|---|---|---|---|---|---|
| Stack 1 | R | 1.4 | 3.9 | 3.275 | 25 |  |  | 7.4 | >4.6 |  |
|  | T | 79.7 | 66.5 | 69.8 |  |  |  |  |  | 3.9 | 2.785714 |
|  | A | 18.9 | 29.6 | 26.925 |  |  |  |  |  |  |
| Stack 2 | R | 1.4 | 3.9 | 3.275 | 17.45 | 4.725 |  |  |  |  |
|  | T | 79.7 | 66.5 | 69.8 |  |  | 3.29805 | 0.682086 | 1.900096 | 2.785714 |
|  | A | 18.8 | 29.6 | 26.295 |  |  |  |  |  |  |
| Stack 3 | R | 2.6 | 6.4 | 5.45 | 12.1801 | 2.947584 | 4.409196 | 0.617156 | 1.519154 | 2.461538 |
|  | T | 73.2 | 57.4 | 61.35 |  |  |  |  |  |  |
|  | A | 24.2 | 36.2 | 33.2 |  |  |  |  |  |  |
| Stack 4 | R | 2.4 | 17 | 13.35 | 7.472491 | 3.586796 | 4.124815 | 0.214418 | 1.518797 | 7.083333 |
|  | T | 49.6 | 27.8 | 33.25 |  |  |  |  |  |  |
|  | A | 48 | 55.2 | 53.4 |  |  |  |  |  |  |

*Amorphous 25%, Crystalline 75%  **Amorphous 100%

Optical Properties @ 780

|  |  | Amorphous | Crystalline | (1:3) Mean |
|---|---|---|---|---|
| Stack 1 | R | 5 | 4.1 | 4.325 |
|  | T | 80.7 | 65.5 | 69.3 |
|  | A | 14.3 | 30.4 | 26.375 |
| Stack 2 | R | 5 | 4.1 | 4.325 |
|  | T | 80.7 | 65.5 | 69.3 |
|  | A | 14.3 | 30.4 | 26.375 |
| Stack 3 | R | 6.7 | 6.4 | 6.475 |
|  | T | 74.9 | 56.6 | 61.175 |
|  | A | 18.4 | 37 | 32.35 |
| Stack 4 | R | 5.2 | 14 | 11.8 |
|  | T | 66.2 | 38.7 | 45.575 |
|  | A | 28.6 | 47.3 | 42.625 |

Fig. 7B

| | | Optical properties @658% Amorphous Crystalline (1:3) | | | Mean Power, mW | Remaining Heat dissipated, mW Amorphous Crystalline | | Signal Reflectivity* (%) Amorphous Crystalline Contrast | | |
|---|---|---|---|---|---|---|---|---|---|---|
| Stack 1 | R | 1.4 | 3.9 | 3.275 | 25 | 4.725 | 7.4 | 1.4 | 3.9 | 2.785714 |
| | T | 79.7 | 66.5 | 69.8 | | | | | | |
| | A | 18.9 | 29.6 | 26.925 | | | | | | |
| Stack 2 | R | 1.4 | 3.9 | 3.275 | 17.45 | 3.29805 | 5.1652 | 0.682086 | 1.900096 | 2.785714 |
| | T | 79.7 | 66.5 | 69.8 | | | | | | |
| | A | 18.9 | 29.6 | 26.925 | | | | | | |
| Stack 3 | R | 2.6 | 6.4 | 5.45 | 12.1891 | 2.947584 | 4.409196 | 0.617156 | 1.519154 | 2.461538 |
| | T | 73.2 | 57.4 | 61.35 | | | | | | |
| | A | 24.2 | 36.2 | 33.2 | | | | | | |
| Stack 4 | R | 1.7 | 16.9 | 13.1 | 7.472491 | 3.781081 | 4.045906 | 0.15188 | 1.509863 | 9.941176 |
| | T | 47.7 | 26.7 | 31.95 | | | | | | |
| | A | 50.6 | 56.4 | 54.95 | | | | | | |

| | | Optical Properties @780 Amorphous Crystalline (1:3) Mean | | |
|---|---|---|---|---|
| Stack 1 | R | 5 | 4.1 | 4.325 |
| | T | 80.7 | 65.5 | 69.3 |
| | A | 14.3 | 30.4 | 26.375 |
| Stack 2 | R | 5 | 4.1 | 4.325 |
| | T | 80.7 | 65.5 | 69.3 |
| | A | 14.3 | 30.4 | 26.375 |
| Stack 3 | R | 6.7 | 6.4 | 6.475 |
| | T | 74.9 | 56.6 | 61.175 |
| | A | 18.4 | 37 | 32.35 |
| Stack 4 | R | 3.4 | 1.9 | 2.275 |
| | T | 59 | 36 | 41.75 |
| | A | 37.6 | 62.1 | 55.975 |

Fig. 8B

| | | Optical properties @658% | | | Remaining Heat dissipated, mW | | Signal Reflectivity* (%) | |
|---|---|---|---|---|---|---|---|---|
| | | Amorphous | Crystalline (1:3) | Mean Power, mW | Amorphous | Crystalline | Amorphous | Crystalline Contrast |
| Stack 1 | R | 1.4 | 3.9 | 3.275 | | | | |
| | T | 79.7 | 66.5 | 69.8 | 25 | 4.725 | 1.4 | 3.9 | 2.785714 |
| | A | 18.9 | 29.6 | 26.925 | | | | |
| Stack 2 | R | 1.4 | 3.9 | 3.275 | | | | |
| | T | 79.7 | 66.5 | 69.8 | 17.45 | 3.29805 | 5.1652 | 0.682086 | 1.900096 | 2.785714 |
| | A | 18.9 | 29.6 | 26.925 | | | | |
| Stack 3 | R | 2.6 | 6.4 | 5.45 | | | | |
| | T | 73.2 | 57.4 | 61.35 | 12.1801 | 2.947584 | 4.409196 | 0.617156 | 1.519154 | 2.461538 |
| | A | 24.2 | 36.2 | 33.2 | | | | |
| Stack 4 | R | 4.3 | 17 | 13.825 | | | | |
| | T | 50.1 | 29.2 | 34.425 | 7.472491 | 3.407456 | 4.0202 | 0.384166 | 1.518797 | 3.953488 |
| | A | 45.6 | 53.8 | 51.75 | | | | |

Optical Properties @780
Amorphous Crystalline (1:3) Mean

| | | | | |
|---|---|---|---|---|
| Stack 1 | R | 5 | 4.1 | 4.325 |
| | T | 80.7 | 65.5 | 69.3 |
| | A | 14.3 | 30.4 | 26.375 |
| Stack 2 | R | 5 | 4.1 | 4.325 |
| | T | 80.7 | 65.5 | 69.3 |
| | A | 14.3 | 30.4 | 26.375 |
| Stack 3 | R | 6.7 | 6.4 | 6.475 |
| | T | 74.9 | 56.6 | 61.175 |
| | A | 18.4 | 37 | 32.35 |
| Stack 4 | R | 2.4 | 2.2 | 2.25 |
| | T | 64.5 | 40.3 | 46.35 |
| | A | 33.1 | 57.5 | 51.4 |

Fig. 9B

Optical properties @658% Remaining Heat dissipated from 25mW input Signal Reflectivity* (%)
Amorphous Crystalline (1:3) Mean Power, mW Amorphous Crystalline Remaining Amorphous Crystalline

| | | | | | | | | | |
|---|---|---|---|---|---|---|---|---|---|
| Stack 1 | R | 0.9 | 3.6 | 2.925 | | | | | |
| | T | 85.6 | 71.7 | 75.175 | | | | | |
| | A | 13.5 | 24.7 | 21.9 | 25 | 6.175 | 18.79375 | 0.9 | 3.6 |
| Stack 2 | R | 1 | 4.1 | 3.325 | | | | | |
| | T | 84 | 69.4 | 73.05 | | | | | |
| | A | 15 | 26.5 | 23.625 | 18.79375 | 2.819063 | 4.980344 | 18.79375 | 0.565128 | 2.317025 |
| Stack 3 | R | 1.8 | 6.4 | 5.25 | | | | | |
| | T | 76 | 57 | 61.75 | | | | | |
| | A | 22.2 | 36.6 | 33 | 13.72883 | 3.047801 | 5.024753 | 13.72883 | 0.542825 | 1.930044 |
| Stack 4 | R | 6.4 | 12.5 | 10.975 | | | 0 | | |
| | T | 50.7 | 32 | 36.675 | | | 0 | | |
| | A | 42.9 | 55.5 | 52.35 | 8.477555 | 3.636871 | 4.705043 | 8.477555 | 0.735938 | 1.437379 |

Optical Properties @780
Amorphous Crystalline (1:3) Mean

| | | | | | |
|---|---|---|---|---|---|
| Stack 1 | R | 7.7 | 5.6 | 6.125 |
| | T | 80.4 | 71.5 | 73.725 |
| | A | 11.9 | 22.9 | 20.15 |
| Stack 2 | R | 7.6 | 5.5 | 6.025 |
| | T | 79.6 | 69.8 | 72.25 |
| | A | 12.8 | 24.7 | 21.725 |
| Stack 3 | R | 3.4 | 4.5 | 4.225 |
| | T | 77.8 | 62.3 | 66.175 |
| | A | 18.8 | 33.2 | 29.6 |
| Stack 4 | R | 1.2 | 4.7 | 3.825 |
| | T | 70.5 | 50.3 | 55.35 |
| | A | 28.3 | 45 | 40.825 |

*Amorphous 25%, Crystalline 75%

Fig. 10B

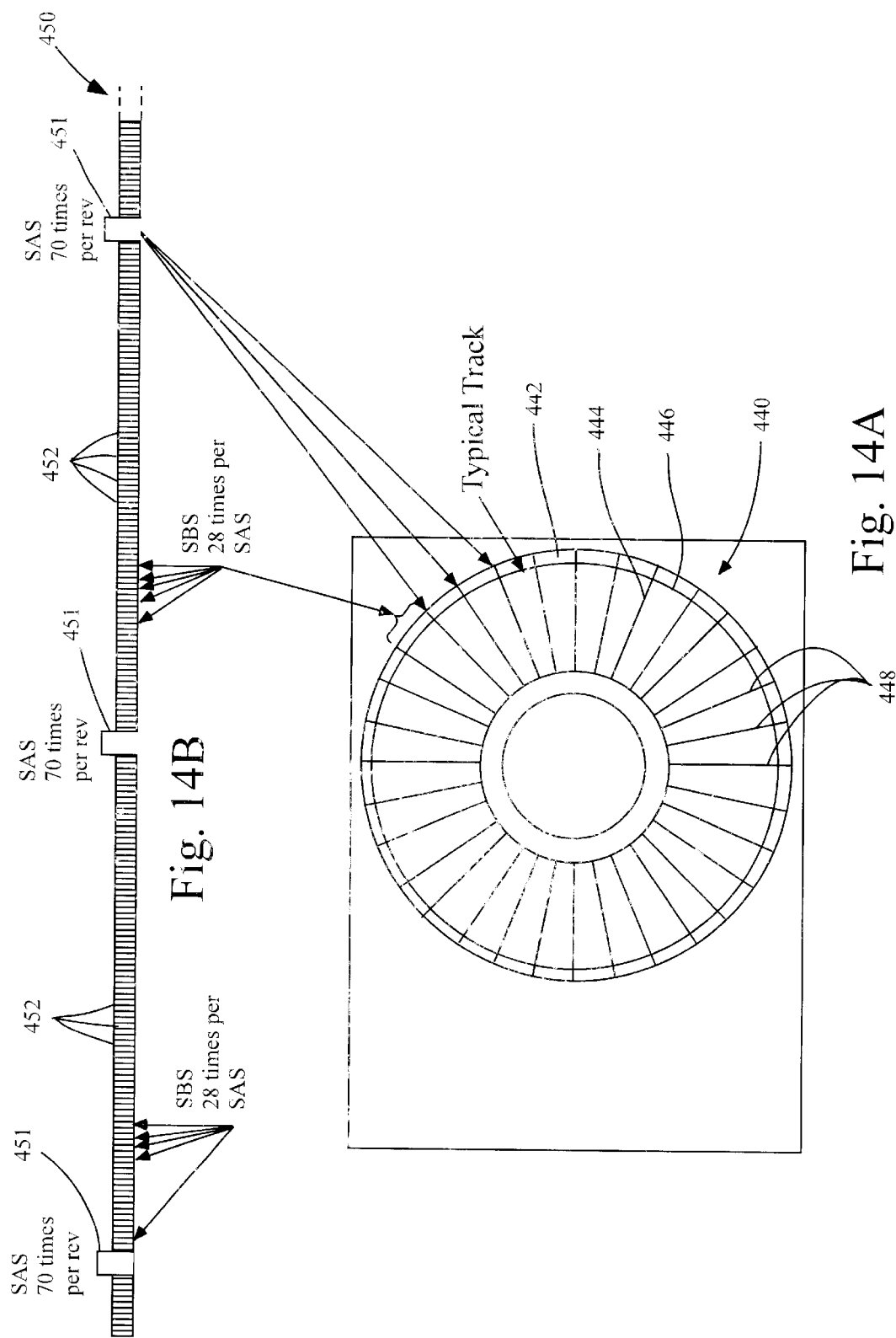

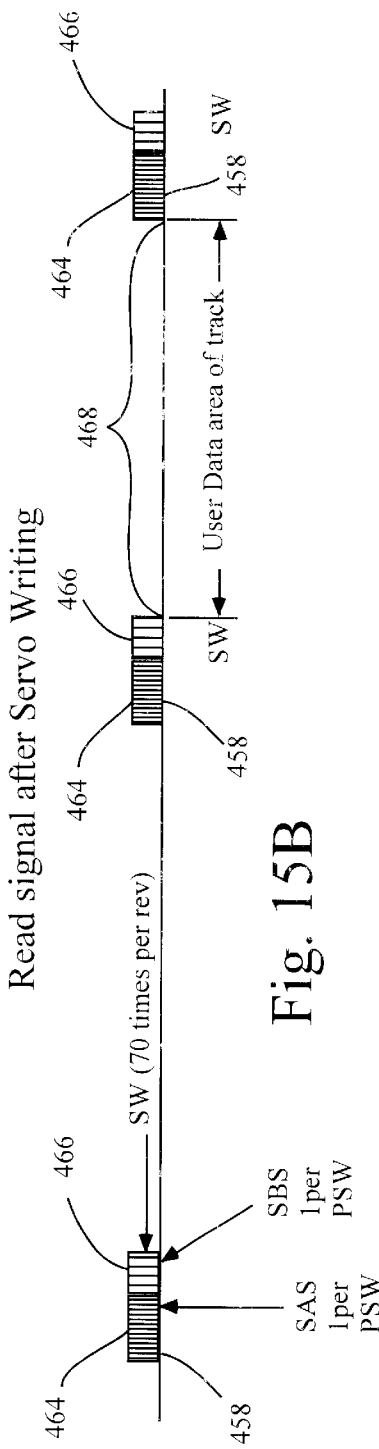
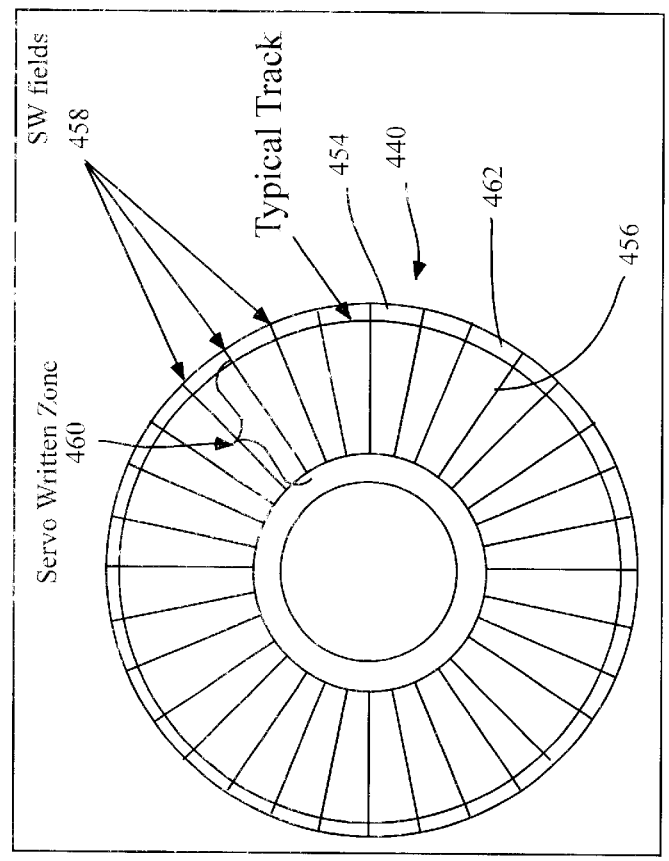
Fig. 15B
Fig. 15A

OPTICAL DATA STORAGE SYSTEM WITH MULTIPLE LAYER MEDIA

BACKGROUND OF THE INVENTION

1. Field of the Invention

This invention pertains generally to systems and methods for optical data storage. More specifically, the present invention relates to an optical data storage system utilizing multi-layered optical storage media comprising a single dedicated servo layer and a plurality of data layers, with each data layer providing an areal density comparable to that of conventional single data layer media. Separate servo and read-write laser beams operate at dual foci within the media, and separate dedicated and embedded servo systems, associated with the servo and read-write beams, provide focus and tracking error correction.

2. The Background Art

Optical information storage technologies have provided increasing storage densities over the years. The demand for greater optical storage densities has been persistent, and various approaches to increased optical storage densities have been considered. Conventional far-field techniques for reading and writing optical media utilize a laser beam focused onto the data plane of an optical medium by an objective lens. For a laser beam of wavelength $\lambda$ and an objective lens with a numerical aperture NA, a read/write spot size of approximately $\lambda/2NA$ is obtained. Conventional techniques currently allow single data layer optical media having storage capacities of between about 2.6 GB and about 4.77 GB in currently used 120 mm DVD optical disks.

Diffraction limitations imposed on the read/write spot size by the light wavelength and numerical aperture (NA) of the focusing optics provide limitations on optical media storage capacity. Increasing the NA of the focusing objective lens to greater than approximately 0.6 results in rapid increases sensitivity to tolerances and results in beam aberrations. Use of shorter wavelength semiconductor lasers will allow increased storage densities in the future, but shorter wavelength laser devices have so far tended to have limited output powers, limited operational temperature ranges, and are subject to materials limitations which have so far resulted in poor reliability and relatively rapid deterioration. The shorter wavelength lasers also reduce wavelength tolerance.

One approach to increased optical storage densities has been through development of near-field optical data storage techniques, which require the use of radiation source apertures and distances on the order of generally less than the wavelength $\lambda$ of the radiation source to allow high storage densities. One near-field technique involves use of a solid immersion lens (SIL) positioned between the objective and the optical medium to provide an increase in NA which is proportional to the refractive index of the SIL material. The use of a SIL, however, is subject to the refractive index limitation of SIL materials. Still another near-field method utilizes tapered optical fibers with metallized sides. While tapered fibers have provided small spot sizes, they are severely limited in output power, and are subject to catastrophic breakdown at the emission aperture. Perhaps the most important drawback to near-field technologies, however, is imposed by the necessary close spacing of the optical medium and light aperture, which requires the use of a flying head. The flying optical head, using a SIL or tapered fiber, adds cost and complexity to storage systems, and the flying height of the head can result in head/disk contact and poor reliability. These problems do not occur with far-field systems.

Another approach to increased optical data storage density has been through use of multiple data layers on a single substrate. This is most easily achieved by placing a single data storage layer on each side of a substrate to provide a dual sided optical medium having effectively twice the storage density of a single-sided optical medium. Dual sided media, however, inconveniently require that the optical disk be "flipped" in order to read the opposite side. Dual optical heads can be used with the media to avoid flipping the medium, but result in substantially higher drive costs.

A more attractive multi-layer optical medium would utilize multiple data layers which are addressable from a single side of the optical medium. However, the reading and writing of an underlying data layer through an overlying outer data layer or layers on a single sided medium introduces numerous complexities. Reduced optical transmission to an underlying data layer through overlying layers, potential cross-talk between adjacent data layers, low signal-to-noise rations, and spherical aberration introduced by the thickness of multiple layers, have presented serious limitations to multi-layered optical media. Heretofore, the only commercially useful single side, multi-layer optical medium has involved dual stamped substrates which are sandwiched together with a spacing of about 60 microns, with substantial de-rating (by a factor of two or more) of the inner and/or outer substrate being required to avoid spherical aberration. The de-rating of the inner data layer results in only a limited increase in areal storage density compared to single side, single layer media. Further, the optical transmission and spherical aberration considerations noted above have limited such media to only two data layers.

There is accordingly a need for an optical data storage system and method that utilizes multiple data layers on a single substrate which allows the same storage capacity on each data layer as is available in single data layer optical media, which provides more than two data layers addressable from a single side of the medium, which provides good optical transmission to underlying data layers through outerlying data layers, which avoids cross-talk between adjacent data layers, and which does not require spherical aberration correction. The present invention satisfies these needs, as well as others, and generally overcomes deficiencies found in currently available optical data storage systems.

SUMMARY OF THE INVENTION

The present invention is an optical information storage system using optical storage media including multiple data layers or stacks wherein each of the multiple data stacks has a storage density comparable to a conventional single layer optical disk. The optical media of the invention thus provide a high areal storage density.

In general terms, the invention comprises an optical medium having a single dedicated servo reference layer and multiple data stacks which each contain an embedded servo format, a servo laser beam positioned to maintain a first focus point on the dedicated servo reference layer, a read-write laser beam positioned to maintain a second focus point on one of the data stacks, a first, dedicated servo system which provides focus and tracking error correction according to error signals generated from the dedicated servo layer, and a second, embedded servo system which provides focus and tracking error correction according to error signals generated from the data stacks. The dedicated servo layer, in different embodiments of the invention, may be positioned either below or above the data stacks in the optical medium, or interposed between data stacks. The data stacks may comprise discrete physical data layers or "virtual" data layers defined by a format hologram. The servo and read-write lasers may differ in wavelength and/or polarization.

By way of example, and not of limitation, in one presently preferred embodiment the optical medium comprises a dedicated servo layer together with a lower or innermost data stack proximate to the servo layer, and at least one overlying or outer data stack positioned above or outside the innermost data stack. More preferably the medium comprises first, second, third and fourth data stacks positioned above the dedicated servo layer, with the first data stack being outermost, and the fourth data stack being innermost and located adjacent the dedicated servo layer. Each data stack comprises a layer of read-write material surrounded by or positioned between at least two dielectric layers.

The read-write material layer in each data stack may comprise any material which, under write conditions by the read-write laser, can undergo an optically detectable change. The read-write material layer thus may comprise any conventional WORM (write-once-read many), ROM (read-only-memory) or reversible read-write material, including ablative, dye-polymer, photopolymer, ferroelectric, magneto-optic and other materials commonly used in optical storage media. In the presently preferred embodiments, the read-write material layer comprises a phase change material such as a GeSbTe (Germanium Antimony Tellurium or "GST") alloy which, under sufficiently high laser irradiation during write conditions, undergoes an optically detectable phase change between a crystalline or polycrystalline phase and an amorphous phase.

The dielectric layers of each data stack may comprise any dielectric material having suitable properties to act as thermal and mechanical barriers for the interposed read-write material layer, and having suitable refractive indices as discussed below. In one preferred embodiment, the dielectric layers comprise ZnS, $SiO_2$, and/or $ZnS/SiO_2$.

The data stacks are separated from each other by a spacer layer. The spacer layers may comprise any interlayer material with suitable optical properties, and preferably comprise an optical quality polymer material. The spacer layer may be formed by spin coating a UV-curable resin followed by curing, or by application of a transfer film or contact tape. A spacer layer is also preferably included between the innermost data stack and the dedicated servo layer. The spacer layers may also comprise a vapor-deposited parylene material.

The read-write laser and servo laser preferably operate at different wavelengths. A dye or dye-doped polymer layer, which is highly absorbing to the read-write laser wavelength and highly transparent to the servo laser wavelength, is preferably located between the dedicated servo layer and the innermost or bottom data stack, so that light from the read-write laser does not reach the dedicated servo layer. In one presently preferred embodiment, data reading and writing are carried out using a red laser at about 660 nm, and servo functions associated with the dedicated servo layer are carried out with a near infrared laser at about 780 nm. Various dyes are suitable for absorption of the red laser light and transmission of the near infrared laser light, including merocyanine, hemicyanine, phthalocyanine, spiropyran and other dyes.

The dedicated servo layer preferably comprises a stamped or embossed servo grating or pattern on a plastic or like substrate. The embossed servo pattern preferably comprises a plurality of grooves and lands which define a servo surface with a plurality of tracks. The embossed servo pattern in the dedicated servo layer preferably includes a reflective coating such as gold or a like reflective metal layer.

The thickness of the read-write material layer in each of the data stacks is carefully controlled or determined according to optical absorption and transmission considerations for both the servo and read-write lasers. Thus, the outermost data stacks will generally utilize a thinner layer of read-write material to improve optical transmission to the inner data stacks. The innermost data stack will generally utilize a thicker layer of read-write material to make up for reduction in optical transmission of the read-write beam through the outer data stacks. In other words, the relative thickness of the phase change material layers for the inner and outer data stacks are designed to equalize the absorption for each data stack while permitting sufficient transmission to underlying data stacks.

The range of thickness available for the read-write material layers in the data stacks may be limited according to transient heat transfer considerations. In embodiments using GST phase change material in the read-write material layer, the thickness of the phase change material layer has a lower limit below which the amorphous-to-crystalline phase change occurs too slowly to permit useful initialization rates, and an upper limit above which the crystalline-to-amorphous phase is difficult to induce. The particular thickness range of the phase change material layer will vary according to the particular phase change material used with the invention. More flexibility in the thickness of the phase change material layers can be achieved through use of thermal quenching metal layer in association with the phase change material layer. However, the use of thermal quenching layers are generally less preferred, as increased laser power is required for writing, and optical transmission is generally reduced by the quenching layer.

The thickness and number of dielectric layers associated with each of the data stacks is also carefully controlled according to considerations involving optical absorption and coherent inter-stack interaction. As noted above, a lower absorption at the read-write material layer is generally desirable in the outermost data stacks, in order to improve overall transmission to the innermost data stack, and a higher absorption at the read-write material layer of the innermost data stack is desirable to make up for attenuation of the read-write beam by the outer data stacks. In this regard, the dielectric layers adjacent to the read-write material layers are structured and configured to act as thin film interference filters in association with the adjacent read-write material layers. In the outermost data stacks, the refractive index and thickness of the dielectric layers is tailored to minimize the electric field strength and corresponding absorption of the read-write laser at the read-write material layer, while at the innermost data stack the refractive index and thickness of the dielectric layers are designed to increase or maximize the electric field strength and absorption of the read-write laser at the read-write material layer. The careful design of these interference filters allows these properties to be optimized for the optical media of the invention.

In one preferred embodiment, a single pair of dielectric layers of selected refractive index and thickness are used in each stack, with the read-write material layer interposed between the pair of dielectric layers. The dielectric layer thickness and refractive index are selected to minimize the electric-field strength in the read-write material layer of the outer data stacks, and to maximize the electric-field strength in the read-write material layer of the inner data stack, as noted above. The dielectric layers may, in one embodiment, each approximate quarter wave ($\lambda/4$) layers, such that the data stack approximates a half wave ($\lambda/2$) stack with respect to the wavelength of the read-write laser. This arrangement reduces electric field strength and minimizes absorption in the outer data stacks, and provides for matching of optical admittance to minimize reflection in the outer data stacks.

In other embodiments of the invention, a larger number of dielectric layers may be used in each data stack, with the dielectric layers above the read-write material layer preferably configured to approximate a high-low (HL) quarter wave stack, and with the dielectric layers below the read-write material layer preferably configured to approximate a low-high (LH) quarter wave stack. In the outer data stacks, the HL stack reduces the electric field of the read-write beam at the read-write material layer, while the LH stack matches the optical admittance to maximize optical transmission. The larger number of dielectric layers may, in some embodiments, increase stack thickness and decrease the wavelength tolerance of the optical medium.

In additional embodiments of the invention, a reflective layer may be associated with the outermost dielectric layer of the innermost data stack. Preferably, a gold (Au) film is used as a reflective layer. In other embodiments, the reflective layer may comprise a dielectric stack, or another relatively low energy loss metal film such as silver (Ag) or alloy thereof.

The spacing between the multiple data stacks of the optical medium is preferably controlled by spacer layers positioned between each data stack. The thickness and material of the spacer layers, and thus the spacing between the data stacks, is carefully controlled to minimize coherent interaction between adjacent data stacks. The read-write beam, when focused in a data stack, will have axial lobes of relatively high intensity which can result in cross-talk or interference with an adjacent data stack if the adjacent data stack is too close. The location of the axial lobes are dependent on the numerical aperture of the focusing objective and the wavelength of the read-write beam. The axial lobe location is determined from physical optics considerations. Generally, the distance between the adjacent data stacks must be large enough such that the axial lobes resulting from focus of the read-write beam on one data stack do not affect or otherwise significantly interact with adjacent data stacks. The spacing between adjacent data stacks also is preferably small enough such that spherical aberration correction is unnecessary. The presently preferred spacer layers comprise UV-curable resin which is spin-coated to a desired thickness, as noted above.

In the dedicated servo layer, servo information is provided which includes, inter alia, a plurality of focus and tracking servo bursts positioned in servo burst sectors, with individual servo bursts in each sector positioned in a quadrature arrangement. Preferably, each focus and tracking servo burst sector includes a first set of servo bursts positioned at zero degrees according to their respective tracks, a second set of servo burst positioned at one hundred and eighty degrees, a third set of servo bursts positioned at ninety degrees, and a fourth set of servo bursts positioned at two hundred and seventy degrees. This quadrature servo pattern allows the servo beam to be servoed at any radial position on the embossed servo pattern (and thus the optical medium) without the need for a radial offset mechanism. Preferably, each data stack includes embedded servo information in the form of servo bursts, which may also be positioned in a quadrature arrangement, for tracking servo functions associated with the read-write beam. The servo bursts in the dedicated servo layer and the embedded servo bursts may be configured as either AC or DC bursts. The use of AC servo bursts offers the advantage of use of an AC coupler, but may tend to require more surface area of the optical medium.

Dual or separate foci for the servo laser beam and read-write laser beam are separately utilized for simultaneously addressing the dedicated servo layer and the data stacks, with the dual foci formed at different depths in the optical medium. Static control of the dual foci is provided by a first movable lens or objective element having high dispersion for the different servo and read-write laser wavelengths via chromatic aberration or other dispersive property, and/or use of wavefront curvature in another objective element used in association the first movable lens. Both the servo beam and read-write beam are focused on the optical medium by the first movable objective element. Dynamic focus control is provided by axial translation of the first movable objective element, as well as axial translation of one or more additional movable lenses, according to instructions from the dedicated and embedded servo systems.

The first or dedicated servo system of the invention preferably utilizes multiple detectors for detection of the servo laser beam reflected from the dedicated servo layer in the optical medium. A dedicated servo control processor receives focus and tracking error signals from the detectors according to the embossed quadrature pattern servo bursts on the dedicated servo layer, and generates responsive focus and tracking error correction signals. One or more movable lens elements, which focus the read-write and/or servo beams into the optical medium, are axially and laterally translated, according to the focus and tracking error correction signals from the control processor, to provide focus and tracking error correction. Preferably, tracking error correction by the dedicated servo system is carried out by lateral positioning of the first movable lens through which both the servo and read-write beams pass. Focus error correction is preferably carried out by the dedicated servo system by axial positioning of a second movable lens, through which only the servo beam passes.

The second or embedded servo system provides for focus and tracking error correction according to signals derived from the read write beam reflected off one of the data stacks. The read-write laser beam, after reflection from a data stack, is split along three paths for recovery of data and generation of focus and tracking error signals. The three paths are focused respectively through three pinholes to three separate detectors. Tracking error signals according to embedded servo bursts, as well as data, are recovered from one detector associated with a pinhole positioned in the confocal plane. The tracking error signals are directed to an embedded servo control system which generates responsive tracking error correction instructions to offset tracking control of the first movable objective element by the dedicated servo system. The two remaining pinholes are offset from the confocal planes of their respective paths to allow generation of focus error signals which are detected by the two other detectors. The focus error signals are derived from the difference of the signals from the detectors positioned behind the two pinholes, and embedded servo focus bursts are not required in the data stack, thereby providing more space for data storage. The focus error signals are directed to the embedded servo control system which generates responsive focus error correction instructions which are used for axial positioning of one or more objective element. Preferably, focus error correction by the embedded servo control system is carried out by axial positioning of the first movable objective element.

In one preferred embodiment, an integrated holographic optical element is used to split the reflected, focused read-write beam into three paths by diffraction. Preferably, the holographic optical element is a binary optic lens which is structured and configured to generate minus first order (−1st), a zeroth order (0th), and plus first order (+1st) diffractions from the read-write beam, with data and tracking error signals recovered from the 0th order diffraction, and focus error signals derived from the −1st order and +1st order diffractions. Higher order diffractions are also produced from the holographic optical element and may also be used, but are generally less preferred.

The three pinholes associated with the three diffracted paths preferably comprise three co-axial pinholes aligned in an array configured to capture the −1st, 0th and +1st order diffractions from the holographic optical element. The holographic optical element and pinhole array are configured and positioned such that the central pinhole of the array lies in the confocal plane of the 0th order diffraction, and the outer two pinholes are axially offset with respect to the confocal planes of the −1st and +1st order diffractions. The holographic optical element, pinhole array, and associated beam detectors and other optical elements preferably are kinematically mounted using multiple precision milled mounting elements. The mounting elements, optical elements and adhesive used to join the optical elements to the mounting elements are matched in coefficient of thermal expansion (CTE) to minimize alignment distortion due to temperature fluctuation.

The pinhole array may be created in-situ by placing a mirror in the object plane of the optical system, positioning a photosensitive absorbing layer at the confocal image plane, and then operating the read-write laser at high output power to burn, photo-bleach, or otherwise open or create the pinholes in the photosensitive layer. The laser output power during pinhole burning must be great enough so that the −1st order, 0th order and +1st order diffractions generate their respective pinholes. The mirror in the object plane preferably has suitably high thermal conductivity to avoid damage to the mirror at this high output power. In-situ pinhole burning in this manner eliminates the need for high precision alignment of the pinholes, as would be necessary if the pinholes were fabricated separately. The absorbing film may comprise a thin dye layer or a thin metal layer such as Tellurium coated on a glass, polycarbonate, or other substrate. The size of the pinholes can be controlled through adjustment of exposure time and laser power. The preferred pinhole size is preferably about the same size as the beam spot size at the confocal image plane or smaller.

Further advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

FIG. 7B is a table illustrating the optical properties of the optical medium of FIG. 7A.

FIG. 8B is a table illustrating the optical properties of the optical medium of FIG. 8B.

FIG. 9B is a table illustrating the optical properties of the optical medium of FIG. 9A.

FIG. 10B is a table illustrating the optical properties of the optical medium of FIG. 10A.

FIG. 14A is a schematic top plan view of an optical medium configured as a disk, showing a preferred arrangement of servo written zones for servo track format for the dedicated servo layer.

FIG. 14B is a schematic illustration of the readout signal for the dedicated servo layer track format of FIG. 14A.

FIG. 15A is a schematic top plan view of an optical medium configured as a disk, showing a preferred arrangement of servo written zones for a data stack.

FIG. 15B is a schematic illustration of the readout signal for a servo written zone of FIG. 15A.

DESCRIPTION OF THE PREFERRED EMBODIMENTS

Figure 1:
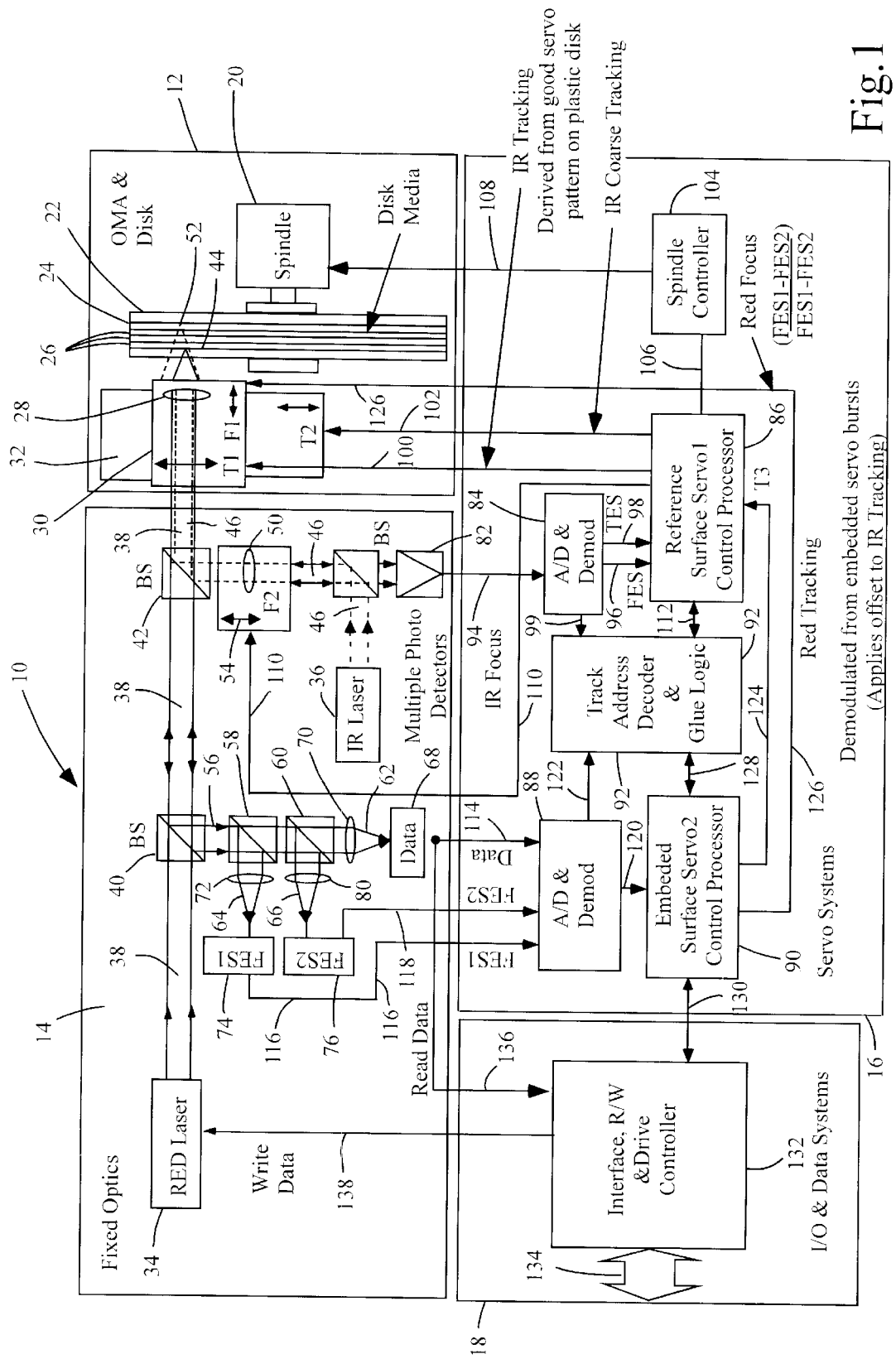
FIG. 1 is a schematic view of an optical data storage system in accordance with the present invention.

Referring more specifically to the drawings, for illustrative purposes the present invention is embodied in the optical data storage system and method shown generally in FIG. 1 through FIG. 24. It will be appreciated that the system and method may vary as to configuration and as to details of the parts and manner of operation without departing from the basic concepts as disclosed herein. The invention is disclosed generally in terms of use with a read-write laser beam operating at about 660 nanometers (nm) as used in current red-laser based DVD technology, and with a servo laser beam operating at about 780 or 785 nm, with optics and optical media configured specifically for these wavelengths. It will be readily apparent to those skilled in the art that various other wavelength combinations may be used with the invention. The sizes and relative distances of the elements and components in the drawings of this disclosure are in many cases exaggerated for reasons of clarity, and are not necessarily shown to scale. Accordingly, the particular dimensions and distances shown in the drawing should be considered as exemplary and not limiting.

Referring first to FIG. 1, a presently preferred optical data storage system 10 in accordance with the invention is shown. The optical data storage system 10 comprises generally an optical mechanical assembly 12, a fixed optics assembly 14, a servo systems assembly 16, and a data systems assembly 18. The optical mechanical assembly 12 includes the majority of movable components of the system 10, while fixed optics assembly 14 includes most of the stationary components of system 10. Servo systems assembly 16 includes the electronic and/or software elements associated with the dual servo systems of the invention as described further below, and the data systems assembly 18 includes electronics and/or software elements associated with data writing and recovery.

The optical mechanical assembly 12 preferably includes a conventional mechanical disk drive assembly shown as rotational spindle 20 which accommodates an optical medium 22. In accordance with the invention, optical medium 22 includes generally a dedicated servo layer 24 together with a plurality of data layers or stacks 26, which are described further below. Optical mechanical assembly 12 also includes a first movable lens 28, a focus and tracking actuator 30, and a coarse tracking actuator 32. First movable lens 28 is preferably configured as a focusing objective lens with high dispersion or a like property, as related further below. Actuators 30, 32 preferably comprise conventional optical translation devices configured to translate first movable lens 28 in axial and lateral directions for focus and tracking error correction as described below.

Fixed optics assembly 14 includes a read-write laser 34 and a servo laser 36. In the presently preferred embodiments, read-write laser 34 is a red laser operating at approximately 660 nm, and servo laser 36 is a near-infrared laser operating at approximately 780 or 785 nm. Numerous types of conventional diode laser devices that operate at these wavelengths are commercially available and may be used with the invention. Various other wavelengths may be used for read-write and servo lasers 34, 36. In particular, blue and shorter wavelength diode laser devices are expected to become commercially available, and these shorter wavelength lasers as well as other lasers may be used with the invention.

Read-write 34 laser generates a read-write beam 38, shown in solid lines, which is directed through beam splitters 40, 42 to movable lens 28, which focuses read-write beam 38 to a read-write focus or focus point 44 on one of the data stacks 26 in optical medium 22. Servo laser 36 generates a servo beam 46, shown in dashed lines, which is directed through a beam splitter 48, a second movable lens 50, beam splitter 42, and first movable lens 28. First movable lens 28 focuses servo beam 46 to a servo focus or focus point 52 on the dedicated servo layer 24 of optical medium. First movable lens 28 is preferably dispersive for the red and near infrared wavelengths of read-write and servo beams 38, 46 respectively, such that servo focus 52 is axially separated or spaced apart from read-write focus 44. The dispersion of first movable lens 28 may be provided by chromatic aberration or other dispersive effect. Alternatively, wavefront curvature associated with first movable lens 28 or other objective element may be used to provide axial separation of foci 44, 52. The dispersive effect of first movable lens 28 provides a static control of the axial separation of foci 44, 52. While the dual foci 44, 52 are shown as generally aligned along the optical axis defined by beams 38, 44, foci 44, 52 need not be aligned in this manner, and may be laterally spaced apart by a fixed offset.

Second movable lens 50 is preferably configured to collimate servo beam 46 in convergence or divergence such that axial translation of second movable lens 50 results in axial movement of servo focus 52 with respect to read-write focus 44. In this manner, dynamic control of the axial separation of foci 44, 52 is provided, to allow selection of a particular data stack 26 within medium 22, and to allow focus error corrections. Read-write focus 44 will generally track along a data track (not shown) in data layer 26, while servo focus point 52 follows tracks (not shown) on dedicated servo layer 24, as described further below. An actuator 54 is associated with second movable lens 50 to provide axial translation movement thereto.

The reflection of read-write beam 38 from medium 22 is returned through first movable lens 28 and beam splitter 42 to beam splitter 40. The reflection of beam 38 is split by beam splitter 40 and directed along optical path 56 through beam splitters 58, 60 to define a data beam 62, a first focus error signal beam 64, and a second focus error signal beam 66. Data beam 62 is focused to a data detector 68 by objective element 70. First focus error signal beam 64 is focused by objective element 72 into a first focus error signal detector 74, and second focus error signal beam 66 is focused into a second focus error signal detector 76 by objective element 80. Data detector 68 preferably comprises a conventional confocal detection arrangement wherein a pinhole (not shown) is positioned in the confocal plane of objective element 70, and a photodetector (not shown) is positioned behind the pinhole. Data detector 68 provides recovered data to data systems 18, and provides tracking error information, obtained from embedded servo information in data stacks 26, to servo systems assembly 16, as described further below. Focus error signal detectors 74, 76 are described further below with reference to FIG. 3.

The reflection of servo beam 46 from medium 22 is returned through first movable lens 28 to beam splitter 42. Beam splitter 42 is dichroic and selectively directs the reflected servo beam 46 back through second movable lens 50 and beam splitter 48 to detector element 82. Detector element 82 is preferably a holographic detector element comprising a plurality of photodetectors which are configured to generate focus and tracking error signals according to servo patterns embossed on dedicated servo layer 24 of medium 22. One preferred detector element 82 for use with the invention is the Panasonic HUL 7274 which includes separate focus and tracking detectors, although various other detectors and detector systems may be used. Beam splitter 48 is preferably a diffractive beam splitter.

Fixed optics assembly 14 and optical mechanical assembly 12 will generally also include various collimating and polarizing optical elements (not shown) which are used to define the various beam paths and optimize power throughputs. Filtering elements (not shown) may be used to prevent servo beam 46 from reaching the detectors 68, 74, and 76 which are associated with the read-write beam 38, and to prevent the read-write beam 38 from reaching detector element 82 associated with servo beam. The use of such collimators, polarizers, filters, and other optical elements are well known to those skilled in the optical sciences, and are not described herein. The relative sizes and distances shown for fixed optics assembly 14, as well as the rest of system 10, are not necessarily shown to scale and are in many cases exaggerated for clarity. The various elements and components of assemblies 12, 14 may also utilize conventional vibration isolation, kinematic mounting, matching of thermal expansion coefficients between optical elements and their mountings, and other considerations well known in the art for reducing noise and optimize throughputs for the various beam paths. Preferably, optical elements used in assemblies 12, 14 have sufficiently large surface area so that beam truncation is avoided and power throughput is maximized. Where possible, optical elements are used in double pass. The particular arrangement of the optical components and elements, and the beam paths generated therefrom as shown in assemblies 12, 14 is only one of many possible arrangements, and should not be considered limiting. Additional arrangements of optical components which are usable with the invention are disclosed in U.S. Provisional Patent Application Ser. No. 60/146,415 entitled "Optical Focus and Tracking Error Detection System", to Ferrier et al. and filed on Jul. 29, 1999, the disclosure of which is incorporated herein by reference.

Servo systems assembly 16 comprises generally a first or "dedicated" servo system including a first servo demodulator 84 and a first servo control processor 86, which are associated primarily with detector element 82 and servo beam 46. Servo systems assembly 16 also comprises a second or "embedded" servo system including a second servo demodulator 88 and a second servo control processor 90, which are associated primarily with data detector 68, focus error signal generators 74, 76, and read-write beam 38. A track address decoder 92 is shared by the first and second servo demodulators 84, 88 and first and second servo control processors 86. 90, and provides glue logic and decoding of tracking error information from the dedicated servo layer 24 and from embedded tracking information in data stacks 26. The first servo demodulator 84 and control processor 86 operate primarily according to servo information embossed or stamped on the dedicated servo layer 24, and the servo system provided by demodulator 84 and processor 86 is accordingly referred to as the "dedicated" servo system. The second servo demodulator 88 and control processor 90 operate primarily according to servo information which is embedded or written with the data stacks 26 of medium 22, and is hence referred to as the "embedded" servo system.

Detector element 82 in fixed optical assembly 12 is operatively coupled to the first or dedicated servo demodulator 84 via communication interface 94. Focus error signals (FES) and tracking error signals (TES) generated by dedicated servo demodulator 84 are directed to dedicated servo control processor 86 via an FES interface 96 and a TES interface 98 (which may comprise the same physical interface). Dedicated servo demodulator 84 is also operatively coupled to track address decoder 92 via interface 99. Dedicated servo control processor 86 is operatively coupled to focus and tracking actuator 30 via interface 100, and is operatively coupled to coarse tracking actuator 32 via interface 102. Dedicated servo control processor 86 is also operatively coupled to a spindle controller 104 via interface 106, which in turn is operatively coupled to spindle 20 via interface 108. Dedicated servo control processor further is operatively coupled to focus actuator 54 via interface 110, and to track address decoder 92 via interface 112.

The second or embedded servo demodulator 88 is operatively coupled to data detector via communication interface 114, to first focus error signal detector 74 via interface 116, and to second focus error signal detector 76 via interface 118. Embedded servo demodulator 88 is also operatively coupled to the embedded servo control processor 90 via interface 120, and to track address decoder 92 via interface 122. Embedded servo control processor 90 is operatively coupled to dedicated servo control processor 86 via interface 124, to focus and tracking actuator 30 via interface 126, to track address decoder 92 via interface 128, and to data systems assembly 12 via interface 130.

Dedicated and embedded servo demodulators 84, 88 and tracking decoder 92 generally utilize conventional analog-to-digital conversion circuitry and hardware and/or software for generation of focus error signals and tracking error signals derived from dedicated servo layer 24 and embedded servo information in data stacks 26. Dedicated and embedded servo control processors 86, 90 likewise preferably use conventional hardware and/or software for generating focus error correction signals and tracking error correction signals respectively from focus error and tracking error signals. The various communication interfaces associated with the dual embedded and dedicated servo systems may comprise any conventional interface devices. The electronics and software associated with servo signal demodulation and servo control systems are well known in the art and are not disclosed in detail herein.

Dedicated servo control processor 86, responsive to tracking error signals derived from dedicated servo layer 24, will generally provide tracking error correction for servo focus point 52 via appropriate lateral translation (normal to the optical axis) of first movable lens 28. Coarse tracking error correction for servo focus point 52 is provided by coarse tracking actuator 32 which moves lens 28 as indicated by arrow T2. Fine tracking error correction for focus point 52 is provided by focus and tracking actuator 30, which laterally translates first movable lens 28, as shown by arrow T1, to correct tracking errors. In response to focus error signals derived from dedicated servo layer 24, dedicated servo control system 86 provides focus error correction for servo focus point 52 via focus actuator 54, which axially translates (along the optical axis) second movable lens 50 as indicated by arrow F2. As noted above, second movable lens 50 collimates servo beam 46 into a divergent or convergent beam, so that axial translation of second movable lens 50 results in axial translation of servo focus point 52.

Since both read-write beam 38 and servo beam are both focused into medium 22 by first movable lens 28, lateral translation of first movable lens 28 by dedicated servo control processor to correct tracking of servo focus point 52 also results in lateral translation of the read-write focus spot 44 as well. In this regard, tracking correction for the read-write focus spot 44 is also provided by the invention. Embedded servo control processor 90, responsive to tracking error signals derived from embedded servo bursts in data stacks 26 and detected by the read-write beam, generates embedded tracking error signals. The embedded tracking error correction signals are used to offset servo tracking correction carried out according to dedicated tracking correction signals. In other words, tracking correction for servo focus 52 on dedicated servo layer 24 is accompanied by corresponding tracking correction of read-write focus in a data layer 26. In this manner, optimum tracking of read-write spot 44 in a selected data layer 26 is maintained while optimum tracking for servo focus spot 52 is maintained.

Embedded servo control system 90, in response to focus error signals from focus error signal detectors 74, 76, derives focus error correction signals for read-write focus spot 44, and provides focus error correction therefor by axial translation of first movable lens 28 by actuator 30. Since axial translation of first movable lens results in movement of both the read-write and servo focus spots 44, 56 along the optical axis, as noted above, an appropriate focus offset is also provided by axial translation of second movable lens 50. In other words, when first objective lens 28 is moved by embedded control processor 90 to correct a focus error for read-write spot 44, dedicated control processor 86 will also generally move second objective lens to maintain optimum focus for servo focus spot 52. Thus, the dual (dedicated and embedded) servo systems of the invention provide both focus error correction and tracking error correction in association with servo beam 44 and servo information embossed on dedicated servo layer 24, and both focus error correction and tracking error correction in association with read-write beam 38 and servo information which is embedded within data stacks 26.

Data systems assembly 18 includes generally a read-write and drive control processor 132, and one or more input/output (I/O) devices or interfaces, which are shown generally as arrow 134. Control processor is operatively coupled to data detector 68 via interface 136, to read-write laser 34 via interface 138, and with servo systems assembly 16 via interface 130. Control processor 132 preferably comprises conventional hardware and software configured for writing data on medium 22 via laser 34, driving medium 22 via spindle motor 20, recovering and processing data from detector 68, and outputting data from medium 22 via I/O 134.

Figure 2:
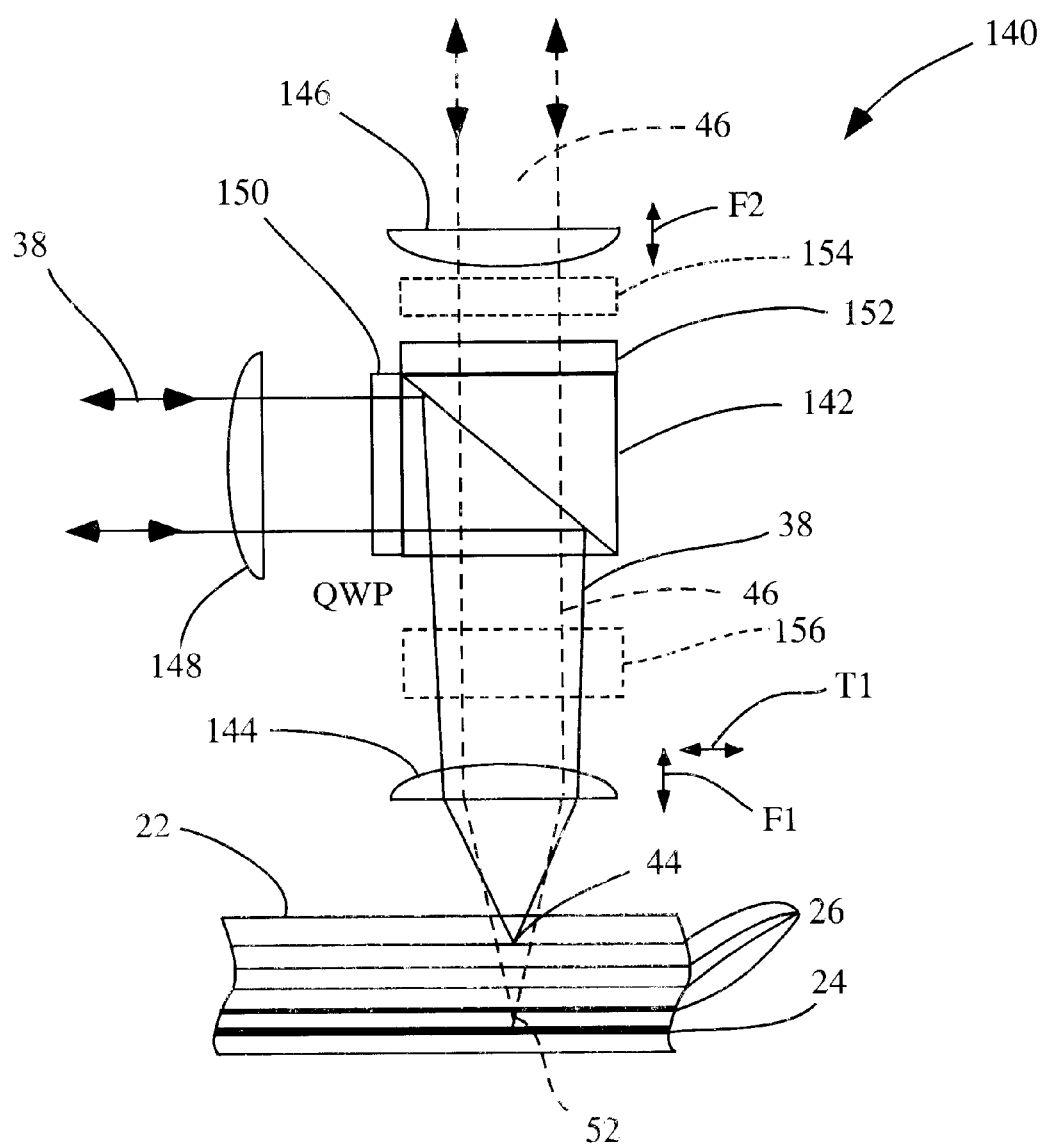
FIG. 2 is a schematic view of an alternative embodiment of a portion of the optical-mechanical assembly of FIG. 1.

Referring now to FIG. 2, there is shown an alternate embodiment of an optical mechanical assembly 140 in accordance with the invention, with like reference numbers used to denote like parts. The optical mechanical assembly 140 includes a dichroic beam splitter 142, a first movable lens 144 and a second movable lens 146. Read-write beam 38 is made convergent by a fixed collimator 148, and passed through beam splitter 142 to first movable lens 144, which focuses read-write beam 38 to a read-write focus spot 44 on one of the data layers or stacks 26 of optical medium 22. Servo beam 46 is made divergent (the divergence is not shown) by second movable lens 146, and is passed through beam splitter 142 to first movable lens 144, which focuses servo beam 46 to servo focus spot 52 on the dedicated servo surface 24 of medium 22. Dichroic beam splitter 142 is shown with a quarter wave plate 150 associated with read-write beam 38, and a half wave plate 152 associated with servo beam 46. A 660 nm red filter or absorber 154 is provided in the path of servo beam 46 to remove any residual red light of read-write beam 38 which may incorrectly pass through beam splitter 142 along the servo beam path. A 780 nm filter or absorber (not shown) may also be utilized in connection with read-write beam 38 to remove residual servo beam light from the read-write beam path. An optical alignment device 156 may also be included for coarse positioning of first movable lens 144 by a user of the invention.

One or more optical actuators (not shown) are included in association with first movable lens 144 to provide axial translation, along the directions of arrow F1, for focus error correction, and lateral translation, along the directions of arrow Ti, for tracking correction. An optical actuator (not shown) is also included with second movable lens 146 for axial movement in the directions of arrow F2 for focus error correction.

The optical mechanical assembly 134 includes both the first and second movable lenses of the invention. The fixed optics assembly 14, when used with optical mechanical assembly 134, will thus not require movable lens 50, optical actuator 54, or dichroic beam splitter 42, as optical mechanical assembly 134 includes dichroic beam splitter 142, and movable lens 146 for focus error correction of servo focus spot 52. In other respects, the optical mechanical assembly 134 operates in generally the same manner as described for optical mechanical assembly 12 as described above. Dedicated servo control processor 86, according to demodulated servo signals from dedicated servo layer 24, provides tracking error correction for focus servo spot 52 by laterally translating first movable lens 144, and focus error correction by axially translating second movable lens 146. Embedded servo control processor 90, in response to demodulated servo signals from embedded servo bursts in data stacks 26, provides focus and tracking error correction for read write focus spot 44 via lateral and axial translation of first movable lens 144. As noted above, actuation of first movable lens 144 will result in movement of both read-write and servo focus spots 44, 52, and corresponding offsets are applied by the dual servo systems of the invention so that optimum focus and tracking for servo focus spot 52 on dedicated servo surface 24 is maintained together with optimum focus and tracking for read-write focus spot 44 in a data stack 26.

Figure 3:
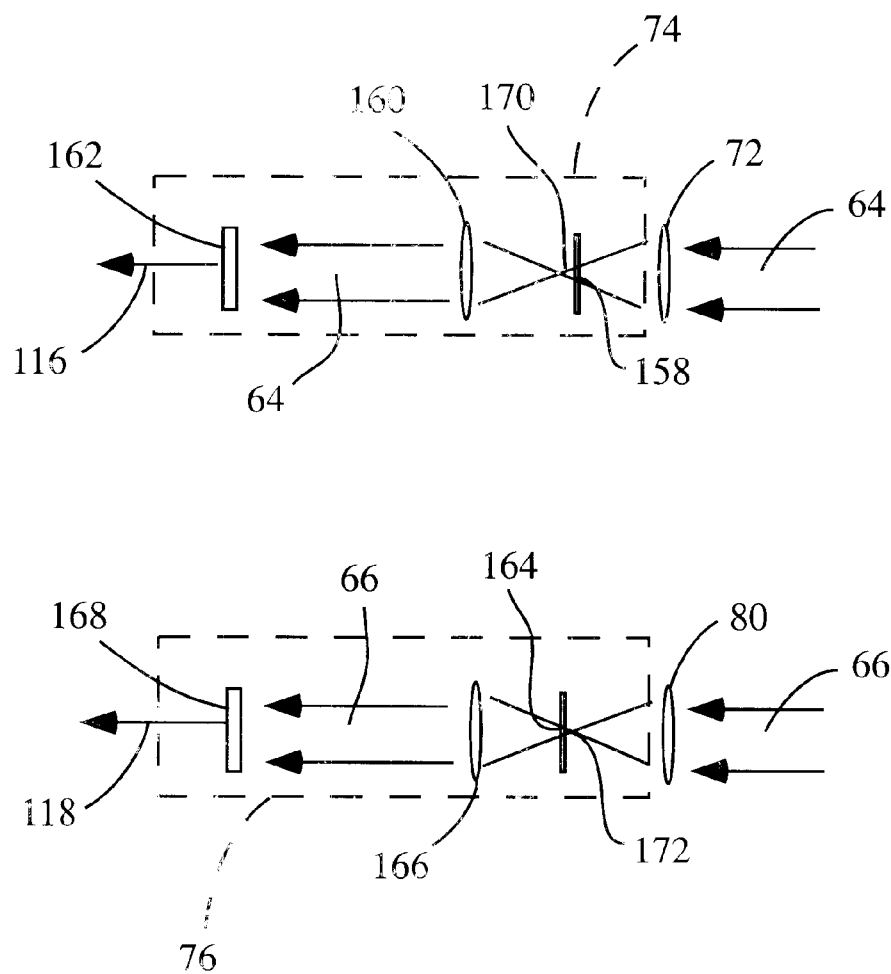
FIG. 3 is a schematic view of the focus error signal generation FES1 and FES2 of FIG. 1.

Referring now to FIG. 3, as well as FIG. 1, there is shown a detail of the focus error signal detectors 74, 76 of fixed optics assembly 12. Focus error signal detector 74 comprises generally a pinhole 158, an objective element 160, and a photodetector 162.

Focus error signal detector 76 likewise includes a pinhole 164, an objective element 166 and a photodetector 168. The reflection of read-write beam 38 from medium 24 is split on its return path into focus error signal beams 64, 66, as described above. Focus error signal beam 64 is focused by objective element 72 through pinhole 158, and then is collimated by objective element 160 and directed to photodetector 162. Focus error signal beam 66 is focused by objective element 80 through pinhole 164 and then collimated by objective element 166 and directed to photodetector 168. Beam splitters 58, 60 in optical system 14 are preferably configured such that approximately fifteen percent of the optical intensity from optical path 56 is directed into each of focus error signal beams 64, 66, and so that approximately seventy percent of the optical intensity is directed into data beam or path 62 to data detector 68. This particular arrangement of optical intensities may be varied for different uses of the invention.

Objective elements 72, 80 and/or pinholes 158, 164 are configured and positioned s such that the points of focus 170, 172 of beams are offset along their optical axes from pinholes 158, 164. In the embodiment shown in FIG. 3, objective elements 72, 80 comprise lenses of similar material and similar focal length, and are positioned generally at the same axial locations in their respective beams 64, 66. Pinholes 158, 164 are axially offset from each other along the paths of beams 64, 66, such that pinhole 158 is positioned generally in front of the point of focus 170, and pinhole 172 is positioned generally behind point of focus 172, as shown in FIG. 3. In other words, the focal plane (not shown) of lens 72 is located in front of pinhole 158, and the focal plane (not shown) of lens 80 is positioned behind pinhole 164.

This dual pinhole arrangement shown in FIG. 3 differs from the convention manner that a pinhole is generally used for confocal depth selection, wherein a pinhole is generally situated so that light reflected from the desired depth in an optical medium, i.e., the focus of the read beam, comes to a focus in the plane of the pinhole, passing efficiently through it. In FIG. 3, the pinholes 158, 164 are positioned in the separate beams 64, 66 so that they are displaced to either side of this focus when read-write beam 38 is focused at the center of a data stack 26. Thus, when read-write focus point 44 is centered on a data stack 26, the point of focus 170 in focus error signal detector 74 occurs slightly before pinhole 158 for path 64 and slightly after pinhole 164 for path 66.

The size of the pinholes 158, 164 is dependent upon the focal length of lenses 72, 80, the beam diameter for paths 64, 66, and the wavelength of read-write laser 34. By way of example, the pinhole size may be sized so that 90% of the intensity of the light beam passes through the pinhole when the pinhole is positioned at the beam focus. The pinhole may typically range in size from about 1 micron in diameter to about 50 microns in diameter, and is typically about 8 microns in diameter. Detectors 162, 168 may comprise standard photodiodes that serve to convert light beam photons to electrical signals in the form of electrons (an electrical current). The electrical signals, which are designated as FES 1 and FES2 respectively for focus error signal detectors 74, 76, are then provided via communication interfaces 116, 118 to embedded servo demodulator 88, which digitizes the signals and generates a focus error correction signal therefrom. Preferably, embedded servo demodulator 88 utilizes conventional differencing circuitry to generate a difference signal of FES1–FES2 for focus error correction. More preferably, the focus error correction is based on a normalized difference signal of (FES1–FES2)/(FES1+FES2). The difference signal is then utilized by embedded servo control processor 90 to axially translate first movable lens 28 with actuator 30, to effect focus error correction.

Generally, if read-write focus spot 44 is positioned too deeply or too shallowly into the medium 22, points of focus 170, 172 are shifted towards the detectors 162, 168, for paths 64, 66, which changes the amount of light passing through each of the pinholes 158, 164. The operation of focus error signal detectors 74, 76 is disclosed in additional detail in U.S. patent application Ser. No. 09/229,140, "Focus Error Signal Generation Using Confocally Filtered Detection" filed on Jan. 12, 1999, the disclosure of which is incorporated herein by reference. Various other focus error signal detection arrangements which are also suitable for use with the invention are disclosed in U.S. patent application Ser. No. 09/229,012, U.S. patent application Ser. No. 09/229,138, and U.S. patent application Ser. No. 09/229,505, the disclosures of which are also incorporated herein by reference.

Figure 4:
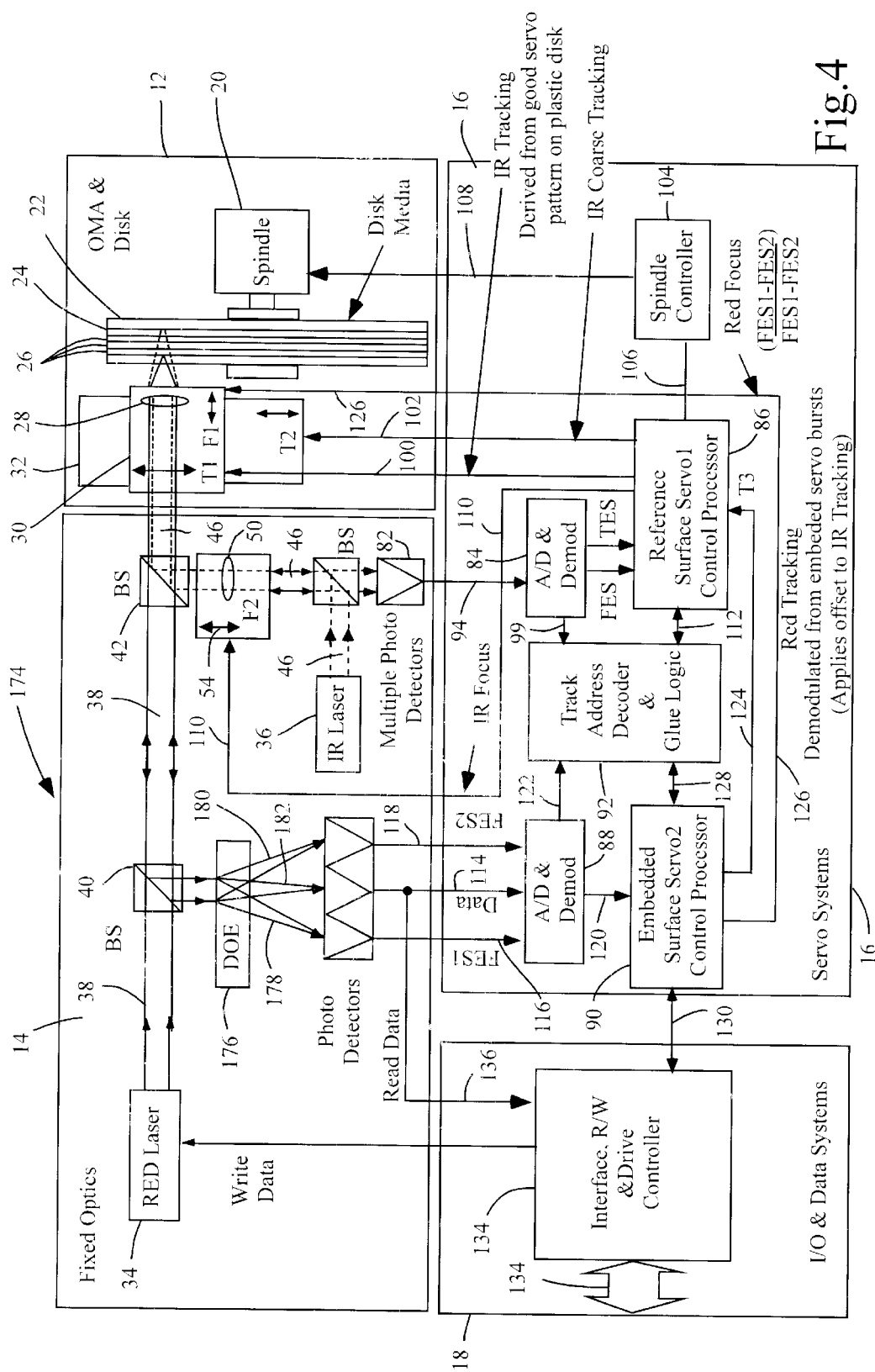
FIG. 4 is an alternative embodiment optical data storage system in accordance with the present invention wherein a diffractive optical detector assembly is used for splitting the reflected read-write laser beam.

Referring now to FIG. 4, an alternative embodiment optical data storage system 174 in accordance with the present invention is shown, with like reference numbers used to denote like parts. In the system 174, a diffractive optical detector assembly 176 is provided in optical path 56 to split optical path 56 via diffraction into a first focus error signal path 178, a second focus error signal path 180, and a data path 182. Optical path 56 is a return path for read-write beam 38 after reflection off a data stack 26 in medium 22, as related above.

Figure 5:
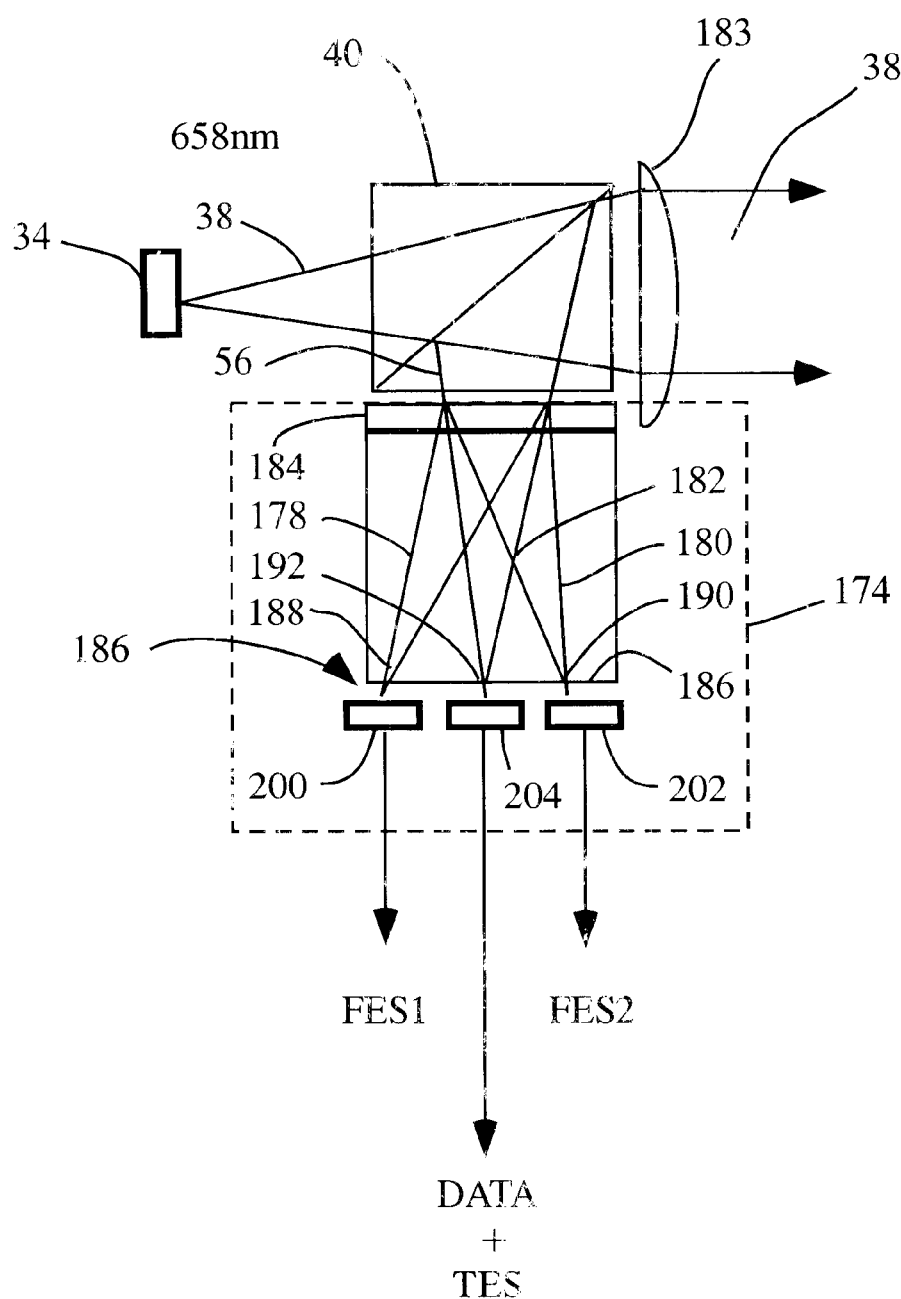
FIG. 5 is a schematic view of the diffractive optical detector assembly of FIG. 3, shown with associated optical components.
Figure 6:
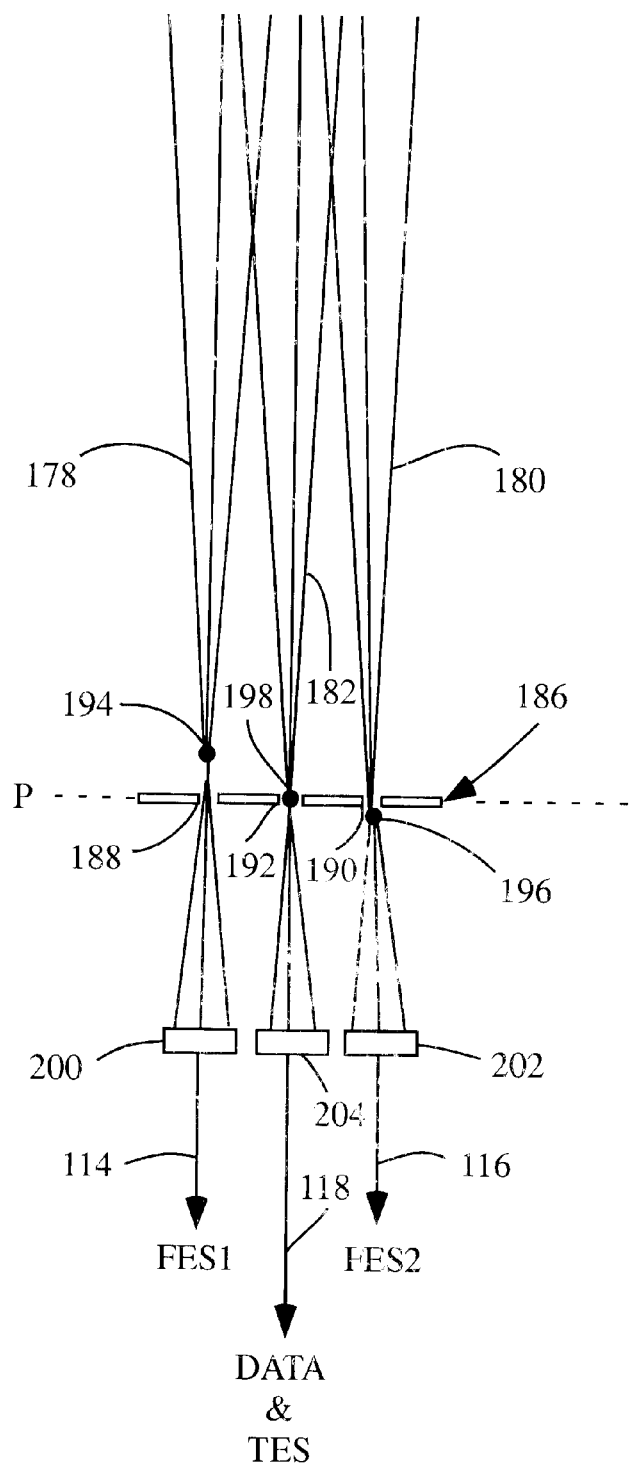
FIG. 6 is a schematic side elevation view of the minus first order, zeroth order, and plus first order diffractions and aligned pinhole array of FIG. 5, with the aligned pinhole array shown in cross-section.

Referring also to FIG. 5 and FIG. 6, diffractive optical detector assembly 176 preferably includes a diffractive optical element 184 which is configured to generate first and second focus error signal paths 178, 180, and data path 182 via diffraction. In the presently preferred embodiments, diffractive optical element 176 comprises a binary optic lens which is configured to generate focus error signal path 178 as a minus first order (−1st) diffraction, data path 182 as a zeroth (0th) order diffraction, and focus error signal path 180 as a plus first order (+1st) diffraction. Diffractive optical element 184 is preferably a binary optic lens, but may alternatively comprise a holographic element. The input beam 56 from beam splitter 40 is convergent as it enters diffractive optical element 182, as shown in FIG. 5. A collimating lens 38 (FIG. 4) directs read-write beam 38 towards beam splitter 42 in fixed optics assembly 12. It should be kept in mind that the relative sizes and distances shown in FIG. 4 through FIG. 6 are not necessarily to scale and are exaggerated for clarity.

The diffracted beams 178, 180, 182 travel from diffractive optical element 184 to an aligned pinhole array 186 containing pinholes 188, 190 and 192. The deviation angle imparted by the diffractive optic element 184 preferably is relatively small so that the wavelength uncertainty of the input beam 56 does not cause significant decenter of the diffracted beams 178, 180, 182 with respect to their target pinholes. The deviation angle for beams 178, 180, 182 as shown is exaggerated for clarity. Pinhole array 186 is preferably positioned such that pinholes 188, 190, 192 lie within a single plane P which is substantially normal to the optical axes of beams 178, 180, 182.

The binary optic lens 184 preferably has efficiency into the −1st and +1st order diffractions 178, 180, as well as residual transmission into the 0th order diffraction 182. The form of the binary optic element 184 is preferably a weak quadratic phase function decentered with respect to the input converging beam 56. The quadratic phase provides a −1st order diffraction 178 that converges slightly faster than the 0th order diffraction 182, and a +1st order diffraction 180 which converges less quickly than the 0th order diffraction 182. In this manner, when aligned pinhole array 186 is generally normal to the optical axes of diffraction beams 178, 180, 182 the focus point 194 (FIG. 6) of diffracted beam 178 will be positioned in front of pinhole 188, with the focus point 196 of diffracted beam 180 positioned behind pinhole 190, and with point of focus 198 positioned generally level with pinhole 192. In other words, point of focus 194 is positioned above the plane defined by aligned pinhole array 186, while point of focus 196 is positioned below the plane, and point of focus 198 lies within the plane defined by pinhole array 186. The size of pinholes 188, 190, 192 is preferably smaller than or equal to the beam spot size at the confocal image plane. Detectors 200, 202 and 204 are positioned behind pinholes 188, 190, 192 respectively. Detectors 200, 202, 204 comprise standard photodiodes that serve to convert light beam photons to electrical signals.

Decentering the quadratic phase function of binary optic element 184 is generally equivalent to including a linear phase term (which alone is a simple grating). This linear phase term causes the +1st order beam 180 to converge off the axis of the 0th order focus point 198. The separation between focussed spots 194, 196, 198 is preferably larger than the sum of the radii of the 0th order spot 198 and the +1st order spot 196 in the focal plane of the 0th order spot 198. However, the separation of the spots is preferably small enough that the wavelength uncertainty associated with beam 56 causes no significant transverse shift with respect to the diffraction limited diameter. For example, if the source is 658 nm (+/−6.6 nm) from laser 34, and the 0th order focused spot 198 has a diameter of 8 microns, the beam separation for focus spots 194, 196, 198 will generally be less than 50 microns, as a 1% wavelength shift will cause a 1% change in the transverse location of the +1st order spot 198, or 0.5 micron, which an acceptable shift in the transverse location of the +1st order focussed spot 198. Also, the diffraction angle is preferably small enough that the uncertainty in the thickness or distance of the binary optic element 184 to pinhole array 186 does not cause a significant change in the transverse position of the focussed +1st order spot 198. For example, if the distance between binary optic element 184 and pinhole array 186 is 1000 microns (+/−10 microns), a 1% change in this distance will cause a 1% change in the transverse shift of the focussed +1st order spot 198. If the nominal offset is 50 microns, this causes an uncertainty of 0.5 microns, which is acceptable for use with the invention.

The plane or normal defined by pinhole array 186 may be tilted with respect to the optical axis. Alternatively, the different axial depths may be stored in the binary optic element 184. Each of the pinholes 188, 190, 192 in the array 186 preferably has a size which is approximately equal to the diameter of the diffraction limited spot formed by the 0th order beam 182. The binary optical element 184 may have optical power to cause the difference in the axial working distances. The input beam 56 is converging, as noted above, and the 0th order spot 198 formed is a conjugate to the system pinhole, and the center pinhole 192 of the pinhole array 186 preferably in a mechanically rigid and local connection to the system pinhole (not shown) which, in the preferred embodiments, may comprise the emission facet (also not shown) of read-write laser 34.

Diffractive optical detector assembly operates in a manner similar to that described for focus error signal detectors 74, 76 as described above. When read-write focus point 44 is centered on a data stack 26, the point of focus 194 occurs slightly before pinhole 188 for diffraction 178, and focus point 196 occurs slightly after pinhole 190 for diffraction 180, so that detectors 200, 202 will receive different amounts of light and generate correspondingly different electric signals. The electrical signals, which are designated as FES1 and FES2 respectively for focus error signal detectors 200, 202, are then provided via communication interfaces 116, 118 to embedded servo demodulator 88, which digitizes the signals and generates a focus error correction signal therefrom as described above. Preferably, a difference signal of FES1−FES2 for focus error correction is used, and more preferably, the focus error correction is based on a normalized difference signal of (FES1−FES2)/(FES1+FES2). The difference signal is used by embedded servo control processor 90 to axially translate first movable lens 28 for focus error correction in the manner described above. The central pinhole 192 provides confocal depth selection for diffraction 182 to provide data detection by detector 204, which sends corresponding electric signals to data systems assembly 18 via communication interface 136.

The optical data storage system 174 of FIG. 4 through FIG. 6 is presently preferred no over the optical data storage system 10 of FIG. 1. The system 10 requires the use of three pinhole detectors with pinholes in different axial planes, situated in three separate lens barrels, and fed by three wavefronts arising from amplitude division of beam 56 returning from the optical head. This arrangement requires substantial initial alignment and is sensitive to small angular deviations of each of the three beams 62, 64, 66. In the optical data storage system 174, the relative alignment of the three pinholes is eliminated, as the alignment can be relegated to a component manufacturer. Also, the diffractive optical element 184 and pinhole array 186 may be fabricated as a compact device with the pinhole array 186 being physically close to the system pinhole, promoting better performance in the presence of deformation of the supporting frame (not shown), or tilting of components. Appropriate design of the diffractive element also permits color separation when two color systems are employed. The system 174 also makes the drive performance relatively immune to thermal deformations, reducing costs and improving performance. Elimination of the relative alignment between pinholes saves drive assembly time and reduces manufacturing costs.

While the preferred embodiment of diffractive optical detector assembly 176 uses a binary optic lens 184 and a pinhole array 186 to capture the −1st, 0th and +1st order diffractions, as described above, it is also possible to use tilted pinhole arrays and a simple diffraction grating, and it is possible to substitute the use of a slit for the pinholes. Use of a slit, however, reduced FES sensitivity and reduced confocal depth sectioning. It is also possible to use larger pinhole arrays to capture higher order terms of the diffractive optic element 184 for greater FES range, and it is further possible multi-order etching to cause the diffractive optic to have high efficiency for a given wavelength and low efficiency for a second, given different wavelength.

The present invention offers a method for manufacturing pinhole array 186, as well as pinholes in general, via an in-situ process by placing a high reflectivity substrate (not shown) in an objective plane, placing an absorbing film (also not shown) in a confocal image plane, and initiating a hole forming step in the absorbing film with a laser. This may be carried out with the optical data storage system 174 using the read-write laser 38 by placing a highly reflective mirror in the objective plane defined generally by medium 22, placing an absorbing film in the confocal plane defined generally by the plane of pinhole array 186, and then operating read-write laser 38 at sufficiently high power to thermally open pinholes 188, 190, 192 in the absorbing film to form pinhole array 186. The size and spacing of the pinholes will be defined by the diffractive optical element 184. This in-situ hole burning is particularly advantageous for use with the multiple data stack media of the present invention. The in-situ pinhole formation provided by the invention eliminates the need for alignment of pinholes in optical drives, and thus reduces manufacturing cost associated with optical drives. The in-situ pinhole burning provided by the invention is useful for various optical microscope applications as well.

The mirror used for in-situ pinhole burning may comprise, for example, an Ag or other metal layer and/or dielectric (ZnS, $SiO_2$) film layers deposited on an optical glass or other transparent substrate. Deposition of Ag, ZnS and $SiO_2$ by sputtering and other techniques onto glass and plastic substrates is well known in the art, and need not be described herein. The thickness of the substrate can be adjusted to minimize spherical aberration of the focused read write beam 38 on the mirror. The mirror preferably has sufficiently high thermal conductivity so that optical damage to the mirror is avoided.

In one preferred embodiment, the pinholes are burned or thermally opened into an absorbing film. The absorbing film may be deposited or coated onto a transparent substrate such as optical glass, plastic or like material. One preferred absorbing film for in-situ pinhole burning utilizes a tellurium alloy sputter coated onto polycarbonate or BK7 glass substrates. The preparation of this preferred absorbing film is described by M. Horie, T. Tamura, M. Ohgaki, H. Yoshida, T Kobayashi, Y Kisaka, and Y. Kobayashi in "Adhesion between Te-based alloy films and fluorocarbon sublayers during the ablative hole burning process", *J. Applied Phys.* (1995), pp. 865, the disclosure of which is incorporated herein by reference. Another preferred embodiment utilizes a layer of dye or dye-doped polymer which is highly absorbing for the read-write laser wavelength as an absorbing film. For a wavelength of 660 nm, numerous dyes are known in the industry, including, for example, oxazine 1, oxazine 725, 3,3'-dipropylthiadicarbocyanine iodide, 3,3'-dioctyltricarbocyanine iodide, thiazine dyes such as methylene blue, and others.

The transmissivity of the Te alloy film prepared according to M. Horie et al. is about 0.1% prior to hole burning. Single pinholes were formed by exposing the film to a single laser pulse from read-write laser 38. The size of the laser beam spot on the absorbing films was 8 micron. The incident power and wavelength for laser 38 were 30 mW and 658 nm respectively. Obtaining a pinhole of an appropriate size using practical laser power is an important consideration. The size of the pinhole should be commensurate with the spot size of the laser beam at the confocal image plane, which is typically about 8 microns. Typical red laser diodes currently used for optical storage have a maximum power output of about 60 mW. With approximately 50% transmission loss occuring through optical components, about 30 mW of laser power will be available for pinhole burning. By adjusting the exposure time, laser power and number of pulses, a pinhole of desired size can be formed in the absorbing film. The absorbing film may be positioned slightly off the confocal image plane in order to tailor the pinhole size. Once the pinhole is formed, the reflecting mirror is removed from the object plane.

Using the above procedure with the optical data storage system 174 to forming pinholes 188, 190, 192, a mirror is positioned in the place of optical medium 22, and read-write beam 38 is focused thereon by first movable lens 28 and pulsed at maximum power (about 60 mW). The reflected beam is diffracted into beams 178, 180, 182, by diffractive optical element 184 and focused onto the absorbing film positioned in the location of pinhole array 186. A single pulse at high power from read-write laser 38 will generally initiate the opening of pinholes 188, 190, 192, and the number of pulses used may be varied according to the desired pinhole size and thickness of the absorbing film. The absorbing film itself becomes the pinhole array element 186 once the pinholes are thermally formed. Preferably, the optical relative optical intensities of the three diffractions used for pinhole burning are about equal, with the optical intensity of beam 56 being divided amongst diffractions 178, 180, 182 at a ration of about 33%/34%/33%.

In this procedure, the 0th order focussed spot 198 is aligned to the input converging beam 56. The fabrication tolerances of the binary optic 184 and the pinhole array 186 are such that the satellite spots focus spots 194, 196, are automatically aligned to the +1st and −1st orders. The presence of the quadratic phase term in the binary optic element 184 ensures that the +1st order has positive defocus with respect to the 0th order, and the −1st order has negative defocus with respect to the 0th order. Hence, if the beam 56 converges somewhat faster than nominal, the transmission through the −1st order pinhole 188 will increase, and the transmission through the +1st and 0th order pinholes 190, 192 will decrease. If the beam 156 converges somewhat slower than nominal, the transmission through the 0th and −1st order pinholes 12, 188 will decrease. The relative change in transmission of the +1st and −1st orders is used to generate focus error signals, as related above, that provide feedback to the system to restore the nominal convergence.

Preferably the pinhole array 186 is created on the opposite face of a single substrate or wafer from the binary optic element 184. The alignment of the diffractive optic pattern (and thus pinhole pattern) thus can be defined through wafer lithographic alignment techniques. For example, commercial vendors of binary optical elements can currently provide an alignment of better than 1 micron. The position of the −1st and +1st order pinholes is pre-calculated using ray-tracing.

Figure 7A:
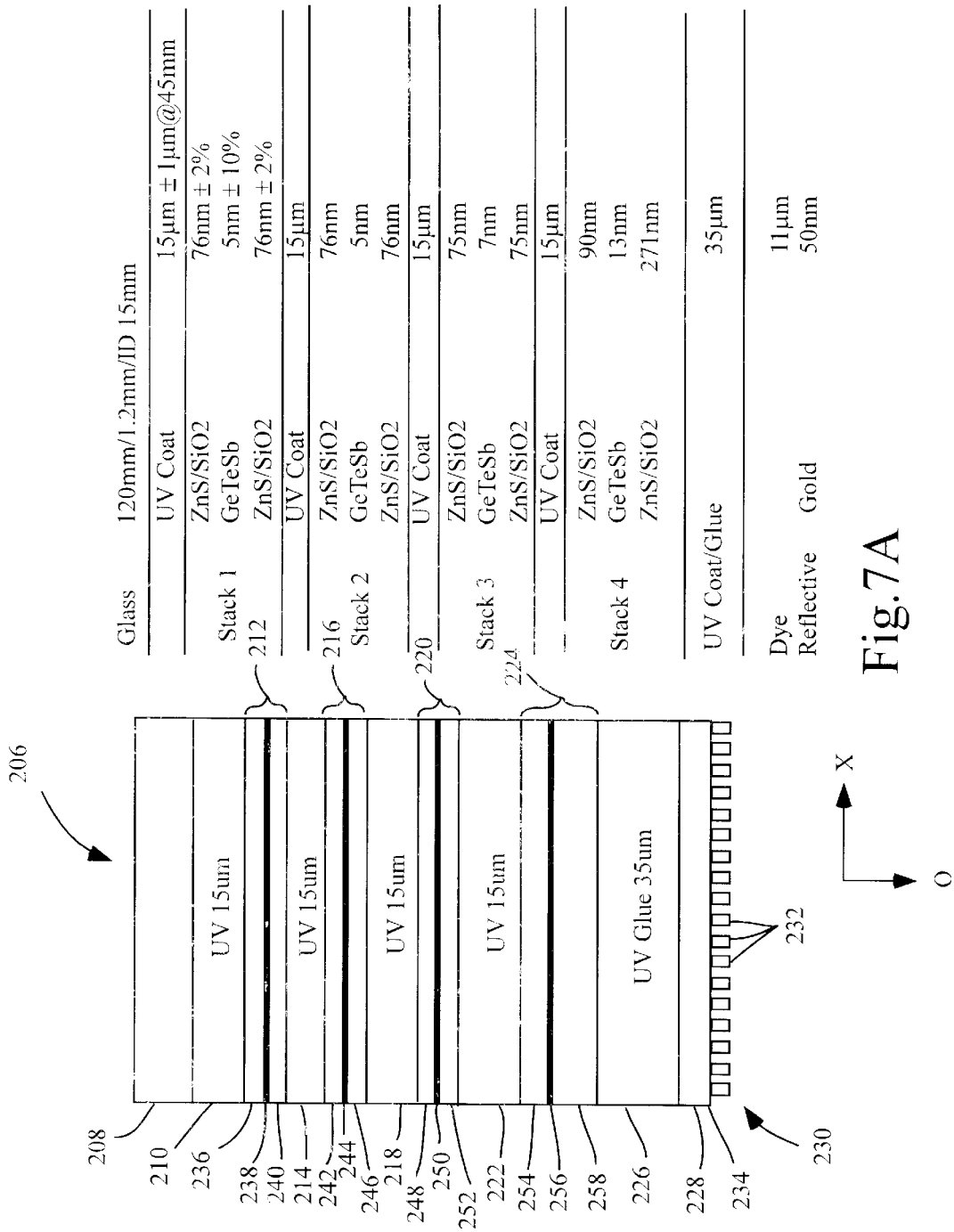
FIG. 7A is a schematic view in cross-section of a first embodiment optical medium in accordance with the invention, wherein each data stack includes a phase change material layer positioned between two dielectric layers.

Referring now to FIG. 7A and FIG. 7B, there is shown a first preferred embodiment optical storage medium 206 in accordance with the invention. The optical storage medium 206 comprises generally a glass substrate 208, a first spacer layer 210, a first data stack 212, a second spacer layer 214, a second data stack 216, a third spacer layer 218, a third data stack 220, a fourth spacer layer 222, a fourth data stack 224, a fifth spacer layer 226, a dye or absorbing layer 228, and a dedicated servo layer 230 having a servo pattern 232 embossed thereon which is defined by a reflective metal layer 234. The first or outermost data stack 212 includes a first or outer dielectric layer 236, a read-write material layer 238, and a second inner dielectric layer 240, with read-write material layer 238 positioned or interposed between dielectric layers 236, 240. Second data stack 216 likewise includes a first dielectric layer 242, a read-write material layer 244, and a second dielectric layer 246, with read-write material 244 layer located between dielectric layers 242, 246. Third data stack 220 similarly comprises a first dielectric layer 248, a read-write material layer 250, and a second dielectric layer 252, with read-write material layer 250 between dielectric layers 248, 252. The fourth or innermost data stack 224 also has a first dielectric layer 254, a read-write material layer 256, and a second dielectric layer 258, with read-write material layer 256 positioned between dielectric layers 254, 258. The relative thicknesses of the various layers and stacks as depicted in FIG. 7A are exaggerated for clarity.

Read-write material layer 238, 244, 250 and 256 may comprise generally any material which, under write conditions by read-write laser 34, can undergo an optically detectable change suitable for writing and reading optical data. The read-write material layers 238, 244, 250, 256 thus may comprise any conventional WORM (write-once-read many), ROM (read-only-memory) or reversible read-write material, including ablative, dye-polymer, photopolymer, ferroelectric, magneto-optic and other materials commonly used in optical storage media.

In optical medium 206, the read-write material layers 238, 244, 250, 256 each preferably comprises a phase change material such as a GeSbTe (Germanium Antimony Tellurium or "GST") alloy which, under sufficiently high laser irradiation during write conditions, undergoes an optically detectable phase change between a crystalline or polycrystalline phase and an amorphous phase. More preferably, read-write material layers 238, 244, 250, 256 each comprise Ge:Sb:Te alloy in the ratio of 2:2:5. This particular alloy of GeSbTe is well known in the art as a re-writable optical data storage material, and provides for good absorption at the read-write laser wavelength of approximately 660 nm.

The preferred thickness available for read-write material layers 238, 244, 250, 256 is generally determined according to transient heat transfer considerations. Where GeSbTe alloys are used, the thickness of read-write material layers 238, 244, 250, 256 has generally a lower limit below which the amorphous-to-crystalline phase change GeSbTe occurs too slowly to permit useful initialization rates, and an upper limit above which the crystalline-to-amorphous phase is difficult to induce. In the case of the presently preferred GeSbTe alloy, a lower thickness limit of approximately 5 nanometers (nm) occurs, below which thickness thermal initiation from the amorphous to the crystalline phase occurs too slowly for most commercial optical media applications. The upper thickness limit will vary depending upon the particular use intended for optical medium 206, but it is presently believed an the upper thickness limit for most commercial uses is around 25 nm. The particular thickness range of the phase change material layer will vary according to the particular phase change material used with the invention.

The thickness of read-write material layers 238, 244, 250, 256 is also determined according to optical absorption and transmission considerations for both the servo and read-write lasers 34, 36 (see FIG. 2). In the multiple data stack media provided by the invention, achieving sufficient optical transmission through the outer data stacks to the inner data stacks and dedicated servo layer is an important consideration. Thus, the outermost data stacks are generally designed with a thinner layer of read-write material to improve optical transmission to the inner data stacks. The innermost data stack will generally utilize a thicker layer of read-write material to make up for reduction in optical transmission of the read-write beam through the outer data stacks. In this manner, the relative thickness of the phase change material layers 238, 244, 250, 256 for data stacks 212, 216, 220, 224 are designed to generally equalize the absorption for each data.

In the optical medium 206, the first and second (outermost) data stacks 212, 216 of medium 206 have GeSbTe read-write material layers 238, 244 that are each approximately 5 nm thickness, which is about as thin as is permitted by the heat transfer considerations noted above. This relatively low thickness permits effective writing and reading in data stacks 212, 216, while also maximizing transmission of the read-write beam 38 by data stacks 212, 216 when read-write focus 44 is positioned in the third or fourth data stack 220 or 224. The fourth or innermost data stack 224 has a read-write material layer 256 which is preferably about 13 nm in thickness. The greater thickness of read-write material layer 256 helps to accommodate the reduced transmission of read-write beam 38 through the outer data stacks 212, 216, 220, and generally equalizes the writing time and reflected signal intensity of the inner data stack 224 to that of the outer data stacks 212, 216. The thickness of read-write material layer 250 in the third data stack 220 will generally be somewhere in between the thickness of the outer read-write material layers 238, 244 and the thickness of the innermost read-write material layer 256. In the optical medium 206, read-write material layer 250 in third data stack 220 is preferably about 7 nm in thickness, which serves to equalize the writing time and reflected signal intensity of third data stack 220 to the other data stacks 212, 216 and 224.

Dielectric layers 236, 240, 242, 246, 248, 252, 254, 258 of medium 206 may in general comprise any dielectric material having suitable properties to act as thermal and mechanical barriers for the interposed read-write material layers 238, 244, 250, 256. More specifically, the thickness, number, and refractive index of dielectric layers 236, 240, 242, 246, 248, 252, 254, 258 for the data stacks 212, 216, 220, 224 are selected according to considerations involving optical absorption and coherent inter-stack interaction. As noted above, a lower absorption at the read-write material layers 238, 244 in the outer data stacks 212, 216 is desirable, in order to improve overall transmission to the inner data stacks 220, 224, and a higher absorption at the read-write material layers 250, 256 in the inner data stacks 220, 224 is desirable to make up for attenuation of the read-write beam 38 by the outer data stacks 212, 216.

With the above goal in mind, the dielectric layers 236, 240, 242, 246, 248, 252, 254, 258 are structured and configured to act as thin film interference filters in association with the adjacent read-write material layers 238, 244, 250, 256. In the first or outermost data stack 212, the refractive index and thickness of the dielectric layers 236, 240 are configured to minimize the electric field strength and corresponding absorption of the read-write laser beam 38 (and servo beam 46) at the read-write material layer 238, and to match optical admittance for reduction of reflection of read-write beam in data stack 212. In the second data stack 216, the refractive index and thickness of the dielectric layers 242, 246 are also configured to minimize the electric field strength and corresponding absorption of read-write laser beam 38 at read-write material layer 244, and to match optical admittance for reduced reflectance. In the innermost data stack 224, the refractive index and thickness of dielectric layers 254, 258 are designed to increase or maximize the electric field strength and absorption of the read-write laser beam 38 at the read-write material layer 256. Finally, in the third data stack 220, the refractive index and thickness of the dielectric layers 248, 252 are selected to equalize the electric field strength and absorption of read-write laser beam 38 at read-write material layer 250 to that of read-write materials layers 238, 244 in the outer data stacks 212, 216, and read-write material layer 256 in innermost data stack 224. The careful design of interference filters with dielectric layers 236, 240, 242, 246, 248, 252, 254, 258 allows electric field strength and absorption properties for each data stack 212, 216, 220, 224 to be optimized for the optical medium 206.

In the specific example shown in FIG. 7A and FIG. 7B, dielectric layers 236, 240, 242, 246, 248, 252, 254, 258 each comprise ZnS/SiO$_2$ (Zinc sulfide/Silicon dioxide) in a ratio of approximately 80%/20% (refractive index n=approximately 2.1331 for λ=approximately 660 nm). The particular dielectric material ZnS/SiO$_2$ is commonly used in re-writable DVD media as a thermal and mechanical barrier for GeSbTe phase change material, and layers or coatings of ZnS/SiO$_2$ carefully controlled thickness are easily fabricated using conventional sputter deposition techniques. As shown in FIG. 7A and FIG. 7B, dielectric layers 236, 240 in first data stack 212 are each approximately 76 nm in thickness, and dielectric layers 242, 246 in second data stack 216 are each approximately 76 nanometers thick. These thickness for each of dielectric layers 236, 240, 242, 246 in this case approximate a quarter wave (λ/4) layer for the read-write wavelength of 660 nm, with the overall thickness of data stacks 212, 216 approximating the thickness of a half wave (λ/2) layer or stack. This arrangement serves to minimize the electric field strength of read-write beam 38 in data stacks 121, 216 via thin film interference, as noted above, and to match optical admittance. The fourth data stack 224 has dielectric layers 254, 258 of approximately 90 and 271 nm thickness respectively, which define generally thin film interference filters for maximizing the electric field strength of read-write beam 38 at read-write material layer 256, and for minimizing the electric field strength of servo beam 46 at read-write material layer 250. Third data stack 220 includes dielectric layers 148, 252 which are each approximately 75 nm in thickness, which serves generally to equalize the electric field strength of read-write beam 38 in read-write material layer 250 to that of read-write material layers 238, 244 and 256 in the first, second and fourth data stacks 212, 216, 224.

The specific thicknesses used for dielectric layers 236, 240, 242, 246, 248, 252, 254, 258 merely provide one example which is specific for the ZnS/SiO$_2$ dielectric material. Other materials, including ZnS, SiO$_2$, TiO$_2$, MgO, GeO$_2$, Si$_3$N$_4$, and the like may also be used, with different dielectric layer thicknesses.

Figure 11:
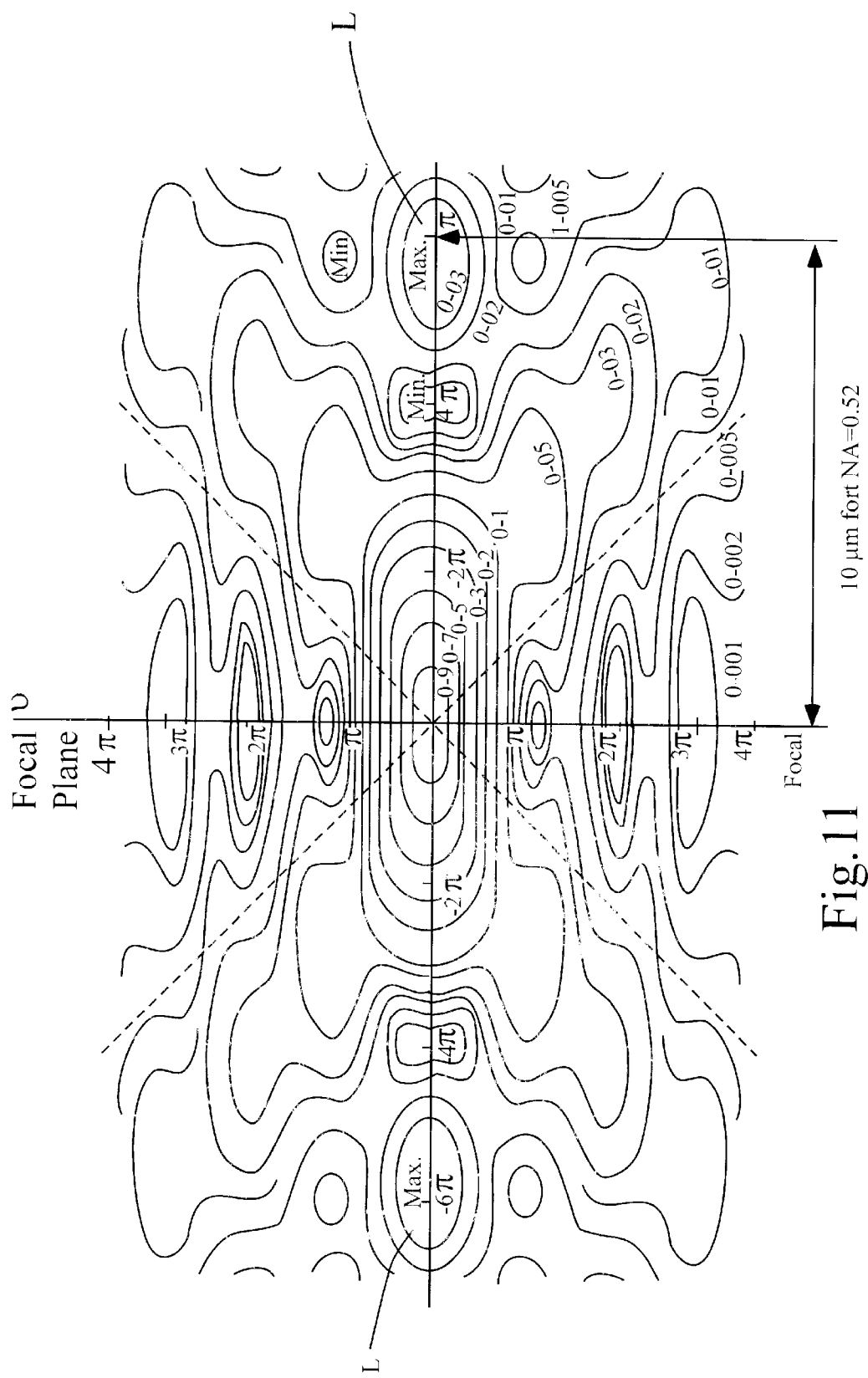
FIG. 11 is a graphical representation of optical intensity versus axial distance for a uniform distributed beam according to diffraction theory.

The data stacks 212, 216, 220, 224 in medium 206 are separated from each other by spacer layer 214, 218 and 222, as noted above. The spacer layers 214, 218 222 may comprise any interlayer material with suitable optical properties, and preferably comprise an optical quality polymer material. The thickness and material of the spacer layers 214, 218 222, and thus the spacing between the data stacks 212, 216, 220, 224, is carefully controlled to minimize coherent interaction between adjacent data stacks. The read-write beam 38, when focused in a data stack 212, 216, 220 or 224, will have axial lobes of relatively high intensity which can result in cross-talk or interference with an adjacent data stack if data stacks 212, 216, 220, 224 are positioned too closely together. The location of the axial lobes are dependent on the numerical aperture of the focusing objective and the wavelength of the read-write beam. The axial lobe location is determined from physical optics considerations. FIG. 11 graphically illustrates optical intensity versus axial distance for a uniform distributed beam according to diffraction theory based on the Linfoot and Wolf model. According to this model, which is well known in the art, intensity I(u) at a position along the z-axis (normal to the focal plane) is provided by $$I(u)=I(0)\sin^2(u/4)/(u/4)^2$$

where I(0) is the intensity at the focal plane, and u is the distance along the z-axis. The first and largest axial lobes L occur at u=6π, and, for the case of λ=658 nm for read-write beam 38, n=1.58 spacer layer material, and NA=0.52 for first movable lens 28, u=6π corresponds generally to a Δz of 10 microns.

Figure 12A:
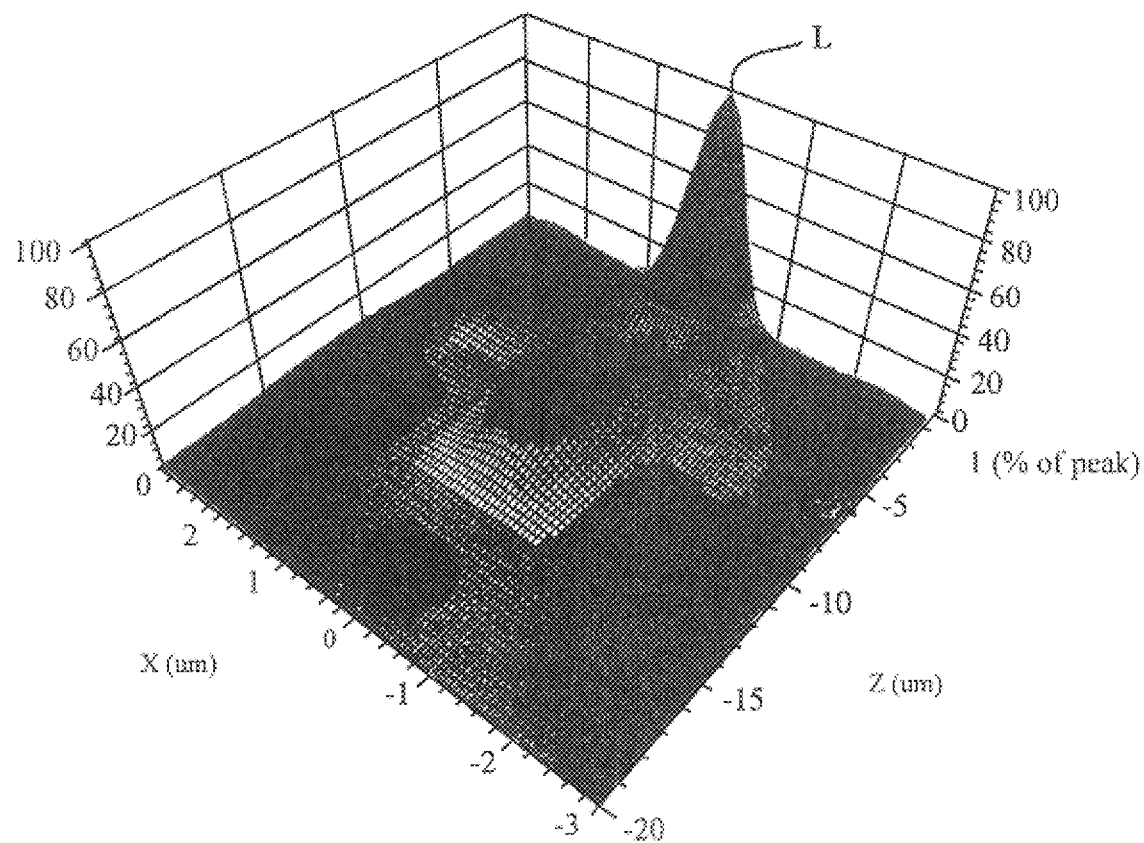
FIG. 12A and FIG. 12B are graphical representations of optical intensity versus axial distance, based on physical optics considerations, for a preferred optical medium.
Figure 12B:
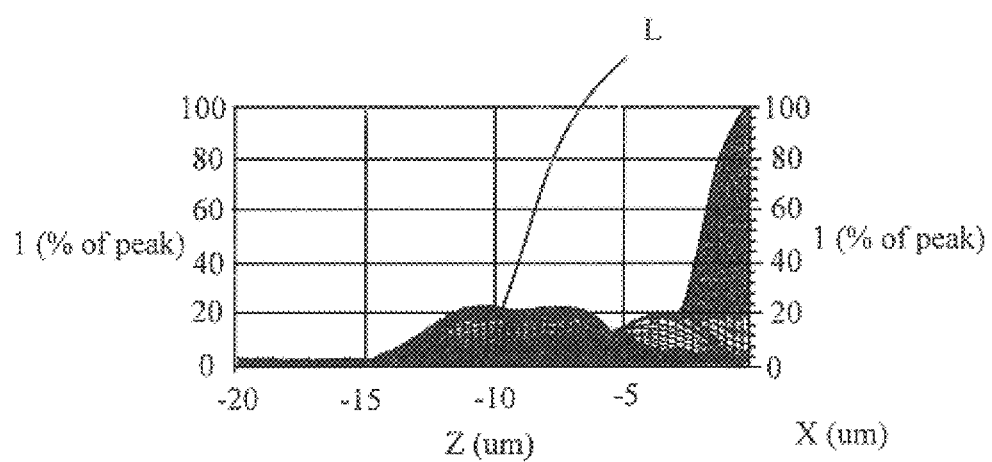

FIG. 12A and FIG. 12B are graphical illustrations of axial lobe intensity determined according to physical optics considerations for data stacks of optical medium 206. FIG. 12A is three dimensional and shows intensity versus distance for the x-axis (focal plane) and z-axis (normal to focal plane), while FIG. 12B shows intensity versus distance along the z-direction. FIG. 12A and 12B also show an axial intensity lobe L with an intensity maximum located at about z=10 microns. The axial lobe L does not extend outward past z=15 microns. The position of axial lobe L is again based on λ=658 nm for read-write beam 38, n=1.58 spacer layer material, and NA=0.52 for first movable lens 28.

With the above in mind, it can be seen that the distance between adjacent data stacks must be large enough such that the axial lobes L resulting from focus of the read-write beam 38 on a data stack do not affect or otherwise significantly interact with adjacent data stacks. FIG. 12A and FIG. 12B show that a separation distance of 15 microns is sufficient for adjacent data stacks, and spacer layers 214, 218, and 222 are accordingly are preferably about 15 microns in thickness. The distance provided by spacer layers 214, 218, 222 avoids any possible cross-talk between data adjacent data stacks 212, 216, adjacent data stacks 216, 220, and adjacent data stacks 220, 224. The presently preferred spacer layers comprise UV-curable resin which is spin-coated to a desired thickness, as described further below.

The spacing between the adjacent data stacks also is preferably small enough such that spherical aberration correction is unnecessary when addressing optical medium 206. Preferably, the combined thickness of data stacks 212, 216, 220, 224 and spacers 214, 218, 222 is less than about 60 microns, to avoid the need for spherical aberration correction. A spacer layer 210 is also provided between first data stack 212 and outer substrate 208, and a spacer layer 226 is also preferably included between innermost data stack 224 and dye layer 228. Preferably, spacer layer 210 is about 15 micron in thickness, and spacer layer 226 is about 35 microns in thickness.

The dye layer 228 preferably comprises a dye which is highly absorbing for the wavelength of the read-write laser beam 38, and relatively transparent for the servo beam 46. For a read-write wavelength of about 660 nm and a servo wavelength of about 780 nm as noted above, there are several types of dyes that may be used in dye layer 228, including oxazine, cyanine, thiazine and phthalocyanine dyes. Specific dye-polymer formulations for dye layer 228 are described further below. The dye layer 228 serves to absorb any remaining light from read-write beam 38 before read-write beam can reach dedicated servo layer 230, while allowing light from servo beam 46 to transmit or pass through dye layer 228, so that only servo beam 46 is reflected from dedicated servo layer 230.

The dedicated servo layer 230 preferably comprises conventional plastic substrate with a stamped or embossed servo grating or pattern 232 thereon. The embossed servo pattern 232 preferably comprises a plurality of grooves and lands which define a servo surface with a plurality of tracks. A reflective coating 234 such as gold or a like reflective metal layer is included on dedicated servo layer 230. The servo pattern 232 is described in further detail below.

The optical properties for optical medium 206 as described above are shown in the table of FIG. 7B. Reflection "R", transmission "T", and absorption "A" information is shown for each of the four data stacks, for both 658 nm and 780 nm, and for GeSbTe read-write material layers in both amorphous and crystalline phases.

As a specific example, the optical medium 206 may be fabricated as follows. A conventional 120 mm/1.2 mm/ID 15 mm substrate of Zeonix or like material, as used in DVD media, is utilized for substrate 208. Spacer layer 210 is formed by spin coating a suitable UV (ultraviolet) curable resin onto substrate 208 and then curing by UV exposure. The UV-curable may comprise, for example, an acrylic based UV-curable resin of the type available from Dymax Corp of Torrington CT. Once such resin which may be used as a material for spacer layers 210, 214, 218, 222 and 226 is OP-30 from Dymax. The OP-30 resin is relatively low viscosity (about 300 cP) for easily spin coating, to provide a 15 micron spacer layer. The OP-30 has a refractive index of about n=1.502, with minimal shrinkage resulting from curing. The spin coated layers may be cured with a standard UV "gun" or hand-held UV lamp to quickly provide a tack-free surface. Various other materials may also be used for spacer layers, and are discussed further below. The use of OP-30 UV curable resin as described above is only one specific example. The use of UV-curable resins and their application by spin coating techniques to form layers or films of selected thickness and refractive index are well known in the art.

Dielectric layer 236 is deposited on the cured spacer layer 210 by sputter deposition of $ZnS/SiO_2$ to a thickness of about 76 nm. The sputter deposition of this material is well known in the art, and need not be described in detail herein. Following deposition of dielectric layer 236, read-write material layer 238 is deposited on dielectric layer 236 by sputter deposition of GeSbTe to a thickness of about 5 nm. The sputter deposition of this material is also well known in the art and is not described here. Dielectric layer 240 is then deposited on read-write material layer 238 by sputter deposition of $ZnS/SiO_2$ to a thickness of about 76 nm. The spacer layers 214, 218 and 222 are formed in the same manner as described for spacer layer 210. Dielectric layers 242, 246, 248, 252, 254, 258 are deposited as described for dielectric layers 236, 240, and read-write material layers 244, 250, 256 are deposited generally as described for read-write material layer 238, with the exception of the different thickness used for the various data stacks as described above.

Spacer layer 226, at the preferred thickness, is generally too thick to form by a single spin coat. Spacer layer 226 may be prepared by successively spin coating and curing three separate layers of OP-30 of about 11.7 micron thickness, to provide a 35 micron thick spacer layer 226. It is contemplated that various contact tapes or film adhesives of suitable optical quality may alternatively be used for this thicker spacer layer, which would be applied as a single film or layer, thereby avoiding multiple spin coats for a single layer.

Dye layer 228 preferably comprises a dye strongly absorbing for the read-write wavelength and transparent to the servo wavelength, which is doped into a polymer. The preparation of dye-polymer layers as writable CD materials is well known in the art. As one specific example, methylene blue (Aldrich Chemical Co. #M44907) may be used, which has strong absorption at 660 nm and is relatively transparent at 780 nm. The methylene blue dye may be used as received from Aldrich. A saturated solution of methylene blue in methylene chloride, which is deep blue in color, may be used by adding the dye solution to the UV curable photopolymer prior to curing. The dye solution should be thoroughly dissolved in the photopolymer. After dissolving the dye solution to the photopolymer, the photopolymer preferably is stored for several hours on molecular sieve to remove any water introduced by the (relatively hygroscopic) methylene blue. The photopolymer is preferably purged with dry nitrogen to remove the methylene chloride, and then filtered before use to remove any undissolved methylene blue or other insolubles. The dye-containing photopolymer may then be spin coated onto the (previously cured) spacer layer 226 at a thickness of 11 micron, and cured with a UV gun in the same manner as described for spacer layer 210.

Some additional dyes which are considered suitable for use in dye layer 228 as described above include oxazine 1, oxazine 725, oxazine 750, 3,3'-dipropylthiadicarbocyanine iodide, and 3,3'-dioctyltricarbocyanine iodide, which are commercially available from several sources.

Various other UV curable formulations are contemplated for use as spacer layers 210, 214, 218, 222, 226 and dye layer 228. The UV curable formulations may be based on radically or cationically polymerized systems, and will generally comprise a monomer or monomer mix, one or more binders, and a UV-activated initiator. Additional components, such as co-initiators, sensitizers, plasticizers, and surfactants may also be included. A coating solvent may also be employed for helping dissolve the components into a uniform solution and optimizing the viscosity for spin coating application.

Radically polymerized UV curable systems will generally comprise, for example, a monomer or monomer mix containing monofunctional and/or multifunctional acrylate, methacrylate, acrylamide, acrylic acid, styrene, and/or derivatives and mixtures thereof. The binder may comprise any polymer and/or functionalized oligomer(s) which are compatible with the monomer. Typical binders for radically polymerized systems include, for example, poly(methyl methacrylate), poly(acrylic acid), polystyrene, poly (acrylamide), and substituted or derivative versions and/or copolymers of these materials. Typical UV initiators include, for example, species that generate free radicals upon UV exposure such as Irgacure 369, Irgacure 500, and Irgacure 651, which are available from Ciba Specialty Chemicals, Inc.

Cationically polymerized systems will generally include, for example, a monomer comprising mono- or multifunctional cyclohexene oxides and ethylene oxides such as Uvacure 1500 and Uvacure 1502, which are available from Radcure Inc., and PC-1000 and PC-1004, which are sold by the Polyset Plastics Company. Suitable binders would include, for example, polymers and oligomers derived from these monomers. Initiators for cationic polymerized systems include, for example, sulfonium salts such as Irgacure 1590, and iron arene initiators such as Irgacure 261, which are available from Ciba Specialty Chemicals. As noted above, the use of UV curable polymers or resins as interlayer materials is well known in the art, and various other types of UV curable polymer systems will suggest themselves to those skilled in the art. Many such UV curable polymer systems are described in detail in "Photopolymers", SPIE Milestone Series Volume MS 114 (1995), R. Lessard and G. Manivannan editors, the disclosure of which is incorporated herein by reference. The 660 nm absorbing dyes can be dissolved into the photopolymers in the manner described above.

Dedicated servo layer 230 is prepared by embossing servo pattern 232 onto a conventional plastic substrate (not shown) using a conventional stamping process. Gold or other reflective metal is then deposited thereon at about 50 nm thickness by conventional techniques to provide metal layer 234. The details of the embossed servo pattern 232 are discussed further below. The embossed servo layer 232 may be adhered to the dye layer 228 in the manner commonly used in preparation of conventional single layer dye-polymer CD media. The dedicated servo layer may be joined to the dye layer 228 prior to the UV curing thereof, followed by subsequent curing, or by a separate layer of UV curable adhesive (not shown) which is subsequently cured to affix the embossed layer 230 to dye layer 228.

Figure 8A:
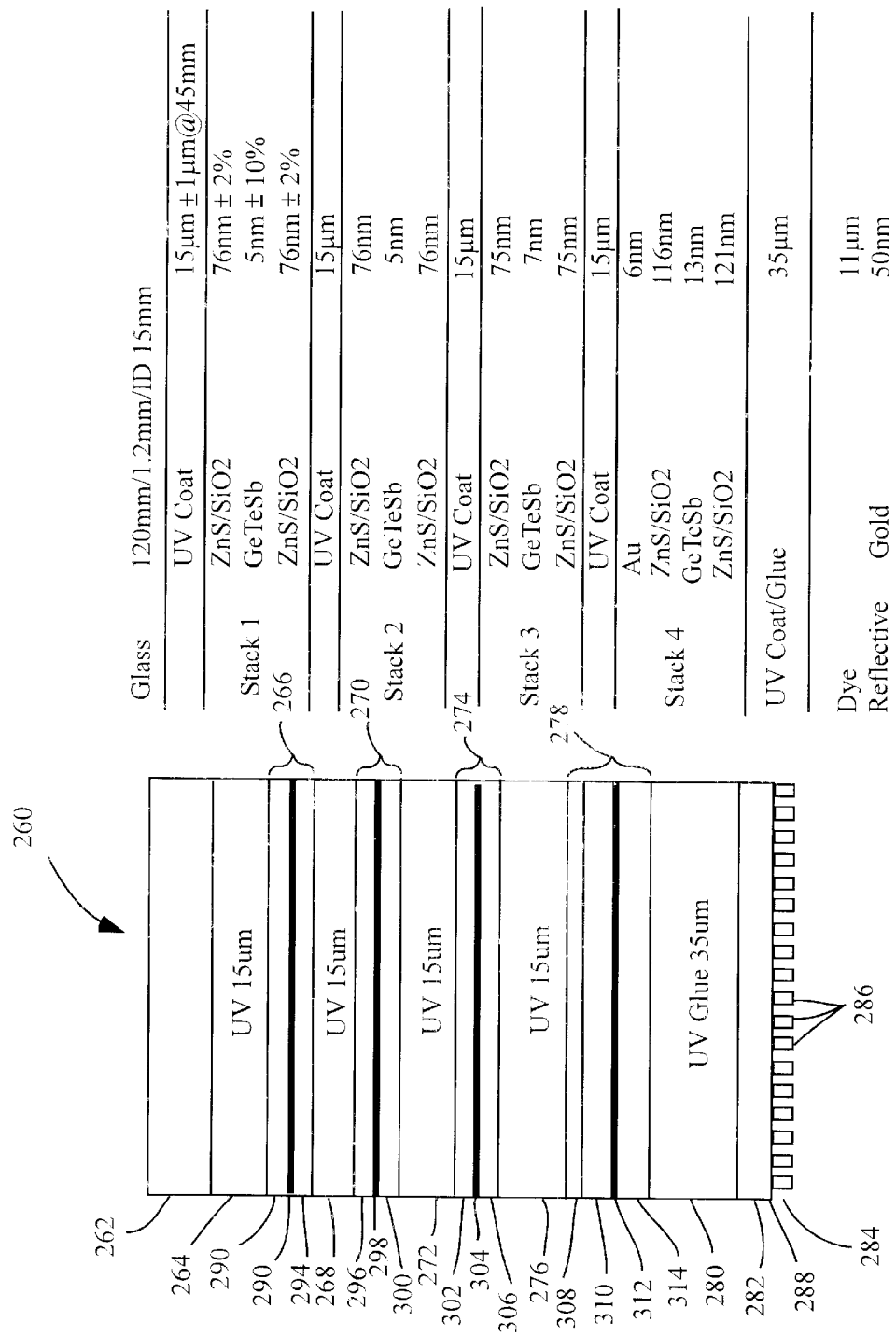
FIG. 8A is a is a schematic view in cross-section of a second embodiment optical medium wherein each data stack includes a phase change material layer positioned between two dielectric layers, and with the innermost data stack including a metal antireflection layer.

Referring next to FIG. 8A and FIG. 8B, there is shown an alternative embodiment optical medium 260 in accordance with the present invention. Optical storage medium 260 comprises generally a glass substrate 262, a first spacer layer 264, a first data stack is 266, a second spacer layer 268, a second data stack 270, a third spacer layer 272, a third data stack 274, a fourth spacer layer 276, a fourth data stack 278, a fifth spacer layer 280, a dye or absorbing layer 282, and a dedicated servo layer 284 having a servo pattern 286 embossed thereon which is defined by a reflective metal layer 288. The relative thicknesses of the various layers and stacks in optical medium 260 are not necessarily shown to scale and may be exaggerated for clarity.

The first, second and third data stacks 266, 270, 274 are generally the same as described for optical medium 206. Thus, first or outermost data stack 266 includes a first or outer dielectric layer 290, a read-write material layer 292, and a second or inner dielectric layer 292, while second data stack 270 includes a first dielectric layer 296, a read-write material layer 298, and a second dielectric layer 300, and third data stack 274 comprises a first dielectric layer 302, a read-write material layer 304, and a second dielectric layer 306. The dielectric layers 290, 294, 296, 300, 302, 306 preferably comprise the same ZnS/SiO₂ material and thicknesses described above for the outer three data stacks of medium 206, described above, and read-write material layers 290, 298, 304 preferably comprise the same GeSbTe material and thickness as described above. Outer substrate 262 and spacer layers 264, 268, 272, 276, 280 also preferably comprise the same material and thicknesses described above, and dye layer 282 and servo layer 284 are generally the same as described for optical medium 206. The dielectric layers are configured as thin film interference filters as described above, and are designed to control the electric field strength and optical admittance in the data stacks to provide selected absorption and reflection properties for the read-write and servo beams 38, 46.

The fourth or innermost data stack 278 of medium 260 comprises a reflective metal layer 308, a first dielectric layer 310, a read-write material layer 312, and a second dielectric layer 314, with first dielectric layer 310 positioned adjacent reflective metal layer 308, and with read-write material layer 312 positioned in between dielectric layers 310, 314. Dielectric layers 310 preferably comprises ZnS/SiO₂ at about 116 nm thickness, and dielectric layer 314 preferably comprises ZnS/SiO₂ at about 121 nm thickness. Read-write material layer 312 preferably comprises GeSbTe with a thickness of about 13 nm, and reflective metal layer 308 preferably comprises gold (Au) of approximately 6 nm thickness.

The gold layer 308 in the innermost or fourth data stack 278 serves generally as an antireflection coating for reducing reflectance of the servo laser beam 46 at 780 nm wavelength by matching optical admittance. Gold layer 308 tends to result in reduced transmission of read-write beam 38 to read-write material layer 312, but the advantage of reduced reflectance to the servo beam 46 outweighs the reduced transmission of read-write beam 38 to read-write material layer 312 for certain uses of the invention. The layer 308 may alternatively comprise other relatively low energy loss metals such as Ag or alloys thereof. Gold is presently preferred for layer 308 because of its resistance to oxidation. Gold layer 308 is deposited by conventional sputter deposition.

The optical properties for optical medium 260 as described above are shown in the table of FIG. 8B, where reflection "R", transmission "T", and absorption "A" information is shown for each of the four data stacks, for both 658 nm and 780 nm, and for GeSbTe read-write material layers in both amorphous and crystalline phases.

Figure 9A:
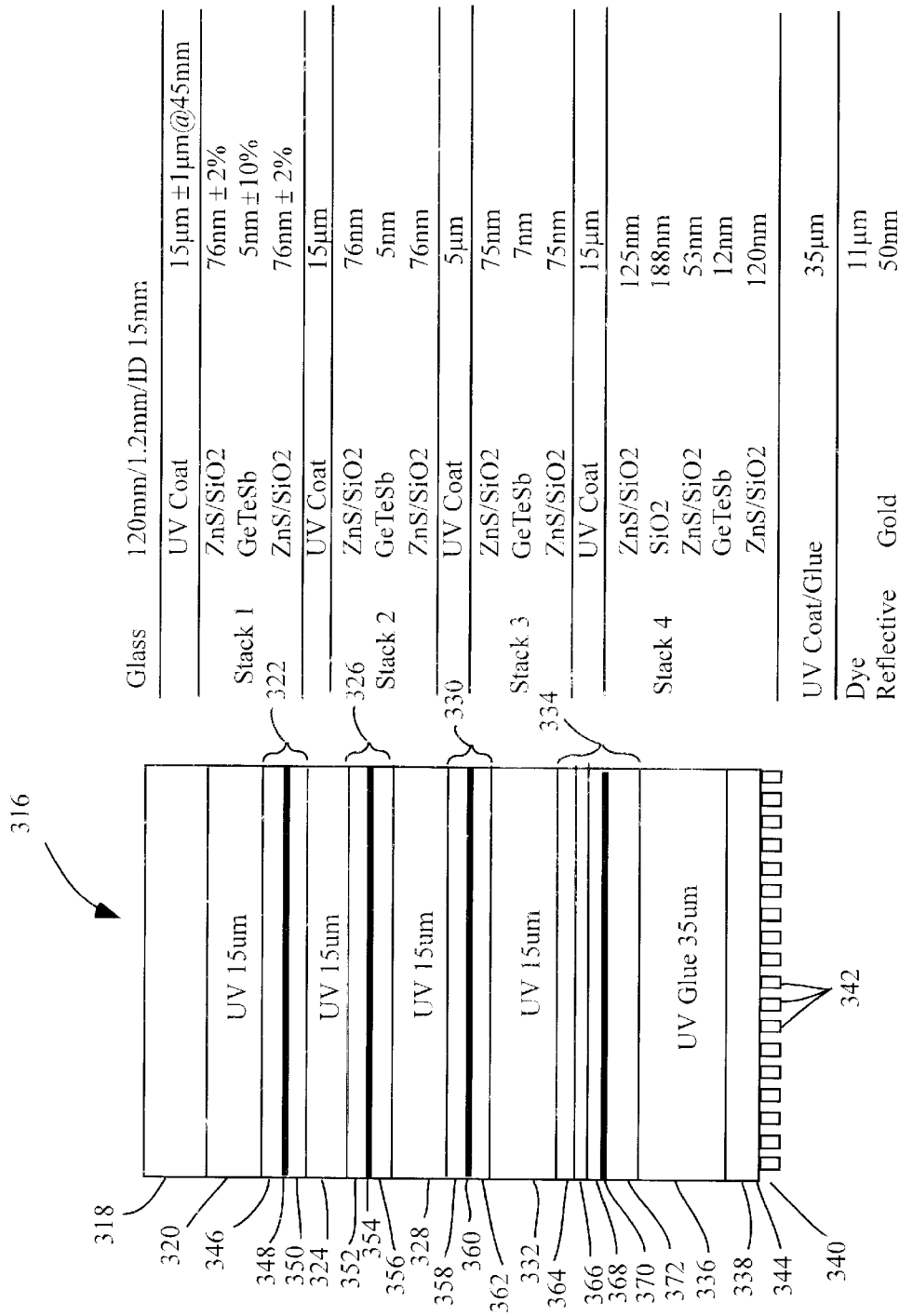
FIG. 9A is a is a schematic view in cross-section of a third embodiment optical medium wherein the three outermost data stacks each include a phase change material layer positioned between two dielectric layers, and with the innermost data stack comprising an antireflection dielectric stack positioned above the phase change material layer, and a single dielectric layer positioned beneath the phase change material layer.

Referring now to FIG. 9A and FIG. 9B, a third embodiment optical medium 316 in accordance with the invention is shown. Optical storage medium 316 comprises generally a glass substrate 318, a first spacer layer 320, a first data stack 322, a second spacer layer 324, a second data stack 326, a third spacer layer 328, a third data stack 330, a fourth spacer layer 332, a fourth data stack 334, a fifth spacer layer 336, a dye or absorbing layer 338, and a dedicated servo layer 340 having a servo pattern 342 embossed thereon which is defined by a reflective metal layer 344. The thicknesses of the layers and stacks in optical medium 316 may be exaggerated for clarity and are not necessarily shown to scale.

First or outermost data stack 322 includes a first or outer dielectric layer 346, a read-write material layer 348, and a second or inner dielectric layer 350, while second data stack 326 includes a first dielectric layer 352, a read-write material layer 354, and a second dielectric layer 356, and third data stack 330 comprises a first dielectric layer 358, a read-write material layer 360, and a second dielectric layer 362. As in the above-described optical media, dielectric layers 346, 350, 352, 356, 358, 362 preferably comprise ZnS /SiO₂ material with the same thickness thicknesses described above for the outer three data stacks of medium 206, 260. Read-write material layers 348, 354, 360 preferably comprise the same GeSbTe material and thickness as described above. Outer substrate 318 and spacer layers 320, 324, 328, 332, 336 preferably comprise the same material and thicknesses described above, and dye layer 338 and dedicated servo layer 340 are generally the same as described for optical media 206, 260.

The fourth or innermost data stack 334 of medium 316 comprises a first dielectric layer 364, a second dielectric layer 366, a third dielectric layer 368, a read-write material layer 370, and a fourth dielectric layer 372, with read-write material layer 368 located between third dielectric layer 368 and fourth dielectric layer 372. First dielectric layer 364 preferably comprises ZnS/SiO₂ of about 125 nm thickness. Second dielectric layer preferably comprises SiO₂ of about 188 nm thickness. Third dielectric layer preferably comprises ZnS/SiO₂ of about 53 nm thickness. Read-write material layer 370 preferably comprises GeSbTe of about 12 nm thickness, and fourth dielectric layer preferably comprises ZnS/SiO₂ of about 120 nm thickness.

The first and second dielectric layers 364, 366 are configured generally as a high-refractive index/low-refractive index stack and define an antireflection coating which is configured to reduce reflectance of the servo beam 46. In this regard, dielectric layers 364, 366 serve the same purpose as metal layer 308 in optical medium 260. As with metal layer 308, the dielectric layers 364, 366 provide decreased reflectance of servo beam 46 at the expense of increased complexity, but the advantage of reduced reflectance to the servo beam 46 outweighs this drawback for certain uses of the invention.

The optical properties for optical medium 316 as described above are shown in the table of FIG. 9B, where reflection "R", transmission "T", and absorption "A" information is shown for each of the four data stacks, for both 658 nm and 780 nm, and for GeSbTe read-write material layers in both amorphous and crystalline phases.

Figure 10A:
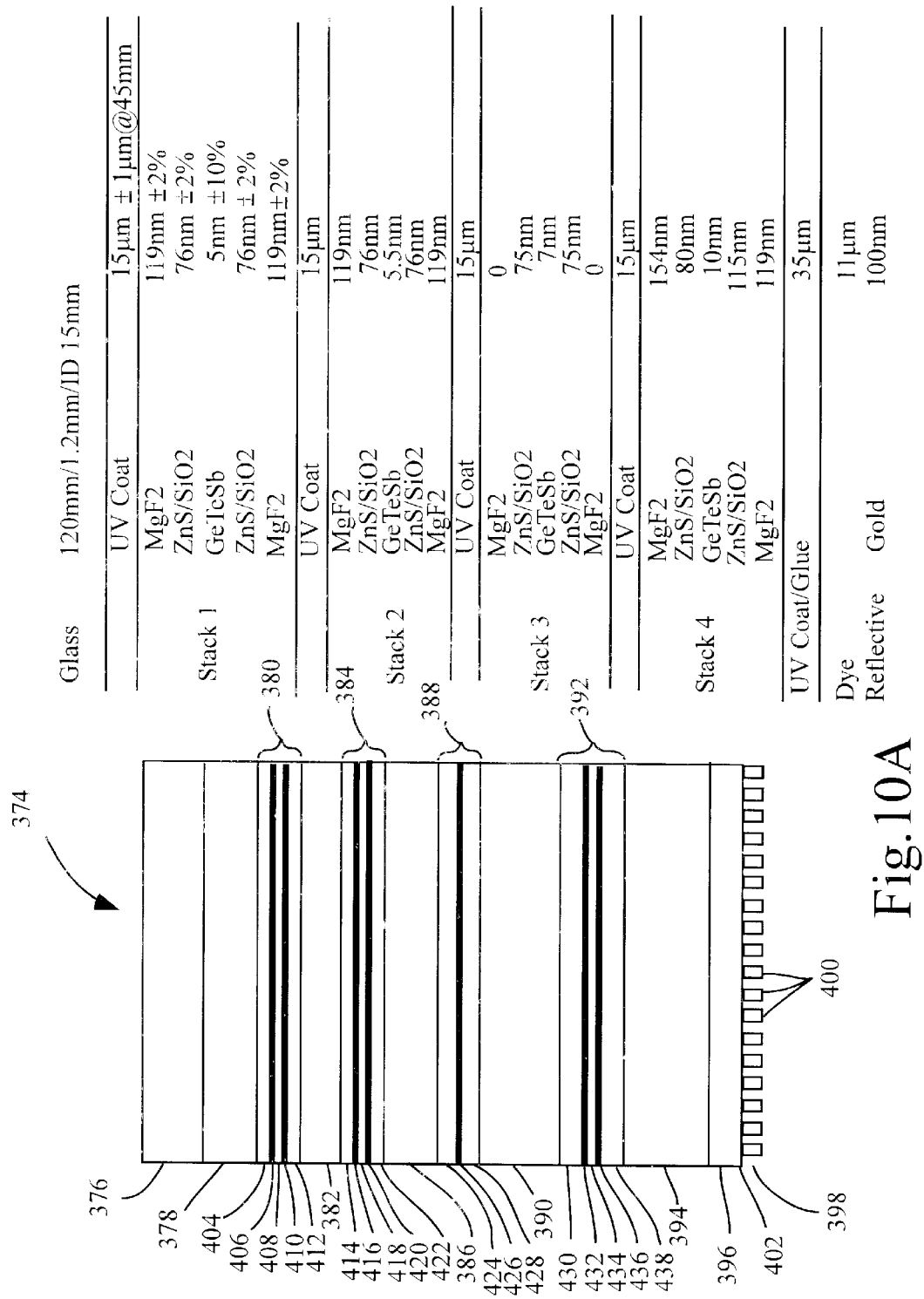
FIG. 10A is a is a schematic view in cross-section of a fourth embodiment optical medium wherein each data stack includes a high-low dielectric stack positioned above a phase change material layer, and a low-high dielectric stack positioned below the phase change material layer.

Referring now to FIG. 10A and FIG. 10B, yet another embodiment of an optical medium 374 in accordance with the invention is shown. Optical storage medium 374 comprises generally a glass substrate 376, a first spacer layer 378, a first data stack 380, a second spacer layer 382, a second data stack 384, a third spacer layer 386, a third data stack 388, a fourth spacer layer 390, a fourth data stack 392, a fifth spacer layer 394, a dye or absorbing layer 396, and a dedicated servo layer 398 having a servo pattern 400 embossed thereon which is defined by a reflective metal layer 402. As with the other optical media related above, the thicknesses of the layers and stacks in optical medium 374 are not necessarily shown to scale.

The first, outermost data stack 380 includes a first dielectric layer 404 of relatively low refractive index, a second dielectric layer 406 of relatively high refractive index, a read-write material layer 408, a third dielectric layer 410 of relatively high refractive index, and a fourth dielectric layer 412 of relatively low refractive index. First and second dielectric layers 404, 406, which are positioned above read-write material layer 408, are designed in thickness and refractive index to define generally a low-refractive index—high-refractive index (LH) dielectric stack which is configured to minimize electric field strength and maximize transmission of read-write beam 38 in read-write material layer 408. Third and fourth dielectric layers 410, 412, which are positioned below read-write material layer 408 are designed in thickness and refractive index to define generally a high-refractive index—low-refractive index (HL) stack which is configured for matching of optical admittance to minimize the reflection of read-write beam 38 and servo beam 46 from data stack 380.

Second data stack 384 similarly includes a first dielectric layer 414 of relatively low refractive index, a second dielectric layer 416 of relatively high refractive index, a read-write material layer 418, a third dielectric layer 420 of relatively high refractive index, and a fourth dielectric layer 422 of relatively low refractive index. First and second dielectric layers 414, 416, which are positioned above read-write material layer 418, are designed in thickness and refractive index to define generally a low-refractive index—high-refractive index (LH) dielectric stack which is configured to minimize electric field strength and maximize transmission of read-write beam 38 in read-write material layer 418. Third and fourth dielectric layers 420, 422, which are positioned below read-write material layer 418, are designed in thickness and refractive index to define generally a high-refractive index—low-refractive index (HL) stack which is configured for matching of optical admittance to minimize the reflection of read-write beam 38 and servo beam 46 from data stack 384.

The fourth or innermost data stack 392 also includes a first dielectric layer 430 of relatively low refractive index, a second dielectric layer 432 of relatively high refractive index, a read-write material layer 434, a third dielectric layer 436 of relatively high refractive index, and a fourth dielectric layer 438 of relatively low refractive index. First and second dielectric layers 430, 432, which are positioned above read-write material layer 434, are designed in thickness and refractive index to define generally a low-refractive index—high-refractive index (LH) dielectric stack which is configured to maximize electric field strength (and the corresponding absorption) of read-write beam 38 in read-write material layer 434. Third and fourth dielectric layers 436, 438, which are positioned below read-write material layer 434, are designed in thickness and refractive index to define generally a high-refractive index—low-refractive index (HL) stack which is configured for matching of optical admittance to minimize the reflection of read-write beam 38 and servo beam 46 from read-write material layer 434.

Third data stack 388 preferably comprises first and second dielectric layers 424, 428, with a read-write material layer 426 positioned therebetween. First and second dielectric layers 424, 428 are structured and configured to act as thin film interference filters which equalize the electric field strength and absorption of read-write beam 38 in read-write material layer 426 and data stack 388, and which match optical admittance to miminize reflectance at read-write material layer 426 and data stack 388.

Low refractive index dielectric layers 404, 412, 414, 422, 430 and 438 preferably comprise magnesium fluoride ($MgF_2$), which has a refractive index n=approximately 1.3781 for $\lambda$=660 nm. The preferred thickness of $MgF_2$ for each of layers 404, 412, 414, 422, 430, 438 are shown in FIG. 10A as approximately 119 nm, 119 nm, 119 nm, 119 nm 154 nm and 119 nm respectively. The $MgF_2$ dielectric material is deposited by sputter deposition using an elevated target temperature, and is generally carried out in the manner described in U.S. Patent No. 5,958,155, entitled "PROCESS FOR PRODUCING THIN FILM", to Kawamata et al., and by Kawamata et al. in "K-M-S (keep-molecules-sputtering) deposition of optical $MgF_2$ thin films", Vacuum, Vol. 51, No. 4, pp. 559–564 (1998), Elsevier Science Ltd., the disclosures of which are incorporated herein by reference.

High refractive index dielectric layers 406, 410, 416, 420, 432 and 436 preferably comprise $ZnS/SiO_2$ (80/20) (n=approximately 2.1331) which is deposited in the manner described above. The preferred thicknesses for layers are shown in FIG. 10A as approximately 76 nm, 76 nm, 76 nm, 76 nm, 80 nm and 115 nm for layers 406, 410, 416, 420, 432 and 436 respectively. The dielectric layers 424, 428 in third data stack also preferably comprise $ZnS/SiO_2$ and each having a thickness of about 75 nm.

The optical properties for optical medium 374 as described above are shown in the table of FIG. 10B, where reflection "R", transmission "T", and absorption "A" information is shown for each of the four data stacks, for both 658 nm and 780 nm, and for GeSbTe read-write material layers in both amorphous and crystalline phases. Different dielectric materials having different refractive indices and different layer thicknesses may also be used in the optical medium 374. In particular, ZnSe (zinc selenide) may be used as a high refractive index material, and $SiO_2$ may be used as a low refractive index material.

A larger number of data stacks, such as five data stacks, may be used in the optical media of the invention, provided that sufficient optical power can be delivered to the innermost data stack. More efficiency in fixed optical system 12 will provide additional power throughput, and a higher NA for movable lens 28 will allow closer spacing of the data stacks while still avoiding cross-talk. Thus, while the optical storage media 206, 260, 316 and 374 each include four data stacks, it is contemplated that a fifth data stack and additional data stacks may be added. The design considerations for such additional data stacks would be similar to that described above for media 206, 260, 316 and 374. The optical data storage media 306, 260, 316, 374 are described above with dimensions that are specific for the presently preferred read-write wavelength of about 660 nm and servo wavelength of about 780 nm. The particular dimensions and materials related above are merely exemplary, however, as the media of the invention may be constructed with different materials and different thicknesses to accommodate various laser wavelengths. It is anticipated that blue diode lasers will soon become commercially available, and the optical media of the invention may be constructed according to the considerations described above for use with a read-write laser with a blue output wavelength.

Figure 13:
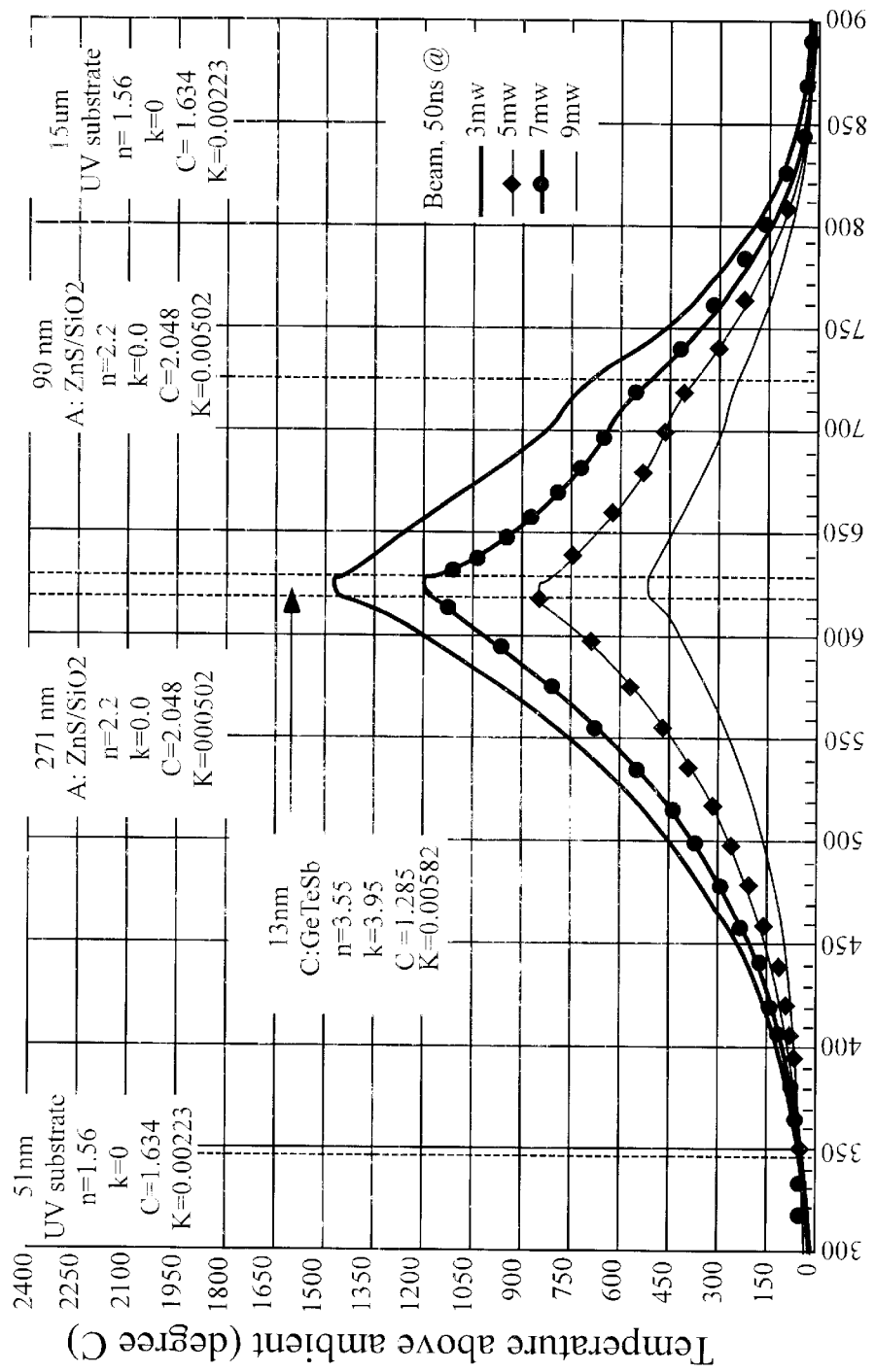
FIG. 13 is a graphical representation of temperature in a data stack along the center of the read/write beam, shown as temperature versus optical distance, for a preferred optical medium.

Referring to FIG. 13, there is shown a graphical representation of temperature in a data stack along the center of the read/write beam, shown as temperature versus optical distance, for typical data stack in accordance with the invention as would occur during data writing. FIG. 13 shows that the heating during writing is sufficiently confined so that thermal deformation of the UV cured spacer layers separating the data stacks will not occur.

Referring now to FIG. 14A, an optical medium 440 in accordance with the invention is shown configured as an optical disk 440 in the manner of a conventional DVD disk. Optical disk 440 may comprise any of the multiple data stack optical media structures described above. Only the dedicated servo layer 442 is shown for optical disk 440, and the data stacks and other portions of disk 440 are omitted from FIG. 14A in order to more clearly show the dedicated servo layer 442. Dedicated servo layer 442 preferably comprises an embossed plastic disk or "EPD" having thereon an embossed or stamped servo pattern 444, which may be formed by conventional stamping techniques. Servo pattern 444 includes a plurality of tracks 446 (only one track shown) which are followed or tracked by the focus point of the servo beam (not shown) during writing and readout of disk 440. Disk 440 also includes a plurality of servo wedges or fields 448.

Referring also to FIG. 14B, there is shown the readout signal pattern 450 as detected from the reflection of the servo beam as the servo focus point follows track 446 in the servo pattern 444 of dedicated servo layer 442. The readout 450 shows each servo wedge 448 as including a plurality of servo address sectors or SAS 451 and a plurality of servo burst sectors 452. In one exemplary embodiment, servo pattern 444 will include seventy servo address sectors 451, with twenty eight servo burst sectors 452 provided with each servo address sector 451. This particular arrangement of servo address sectors 451 and servo burst sectors 452 is only exemplary, and may be varied as required for particular uses of optical disk 440.

Referring to FIG. 15A, a single data stack 454 is shown on optical disk 440, with an embedded servo pattern 456 included in or on data stack 454. The dedicated servo layer and other data stacks are not shown on disk 440 in FIG. 15A in order to more clearly show the embedded servo pattern 456 of data stack 454. The term "embedded" in this context means that servo pattern 456 is embedded or recorded within the data stored on the read-write material layer (not shown) of data stack 454. Each data stack of disk 440 will include a like embedded servo pattern 456. The embedded servo pattern 456 is preferably pre-recorded on disk 440 by manufacturer prior to data recording on disk 440. The embedded servo pattern is formed, in cases where GST phase change materials are used, by creating reflectivity differences due to amorphous and crystalline phases with the read-write beam under write conditions. The term "dedicated" as used with servo layer 442 above means generally that dedicated servo layer 442 is dedicated to servo information and generally does not (although it may) include other types of stored data.

Embedded servo pattern 456 includes a plurality of servo wedges or wedge fields 458, with each servo wedge 458 having a servo written zone 460. Embedded servo pattern 456 also includes a plurality of tracks 462 (only one track shown) which are followed or tracked by the focus point of the read-write beam (not shown) during writing and readout of disk 440. FIG. 15 shows the readout signal for track 462 as detected from the reflection of the read-write beam as the read-write focus spot (not shown) follows track, each servo wedge 458 preferably includes a servo address sector 464 and a servo burst sector 466. Data stack 456 further includes a plurality of data storage areas 468. In one exemplary embodiment, there are seventy servo wedges or fields 458 interspersed between data areas 468 per revolution of disk 440. This arrangement of servo wedges 458 may of course vary according to the particular data storage use of disk 440.

Figure 16:
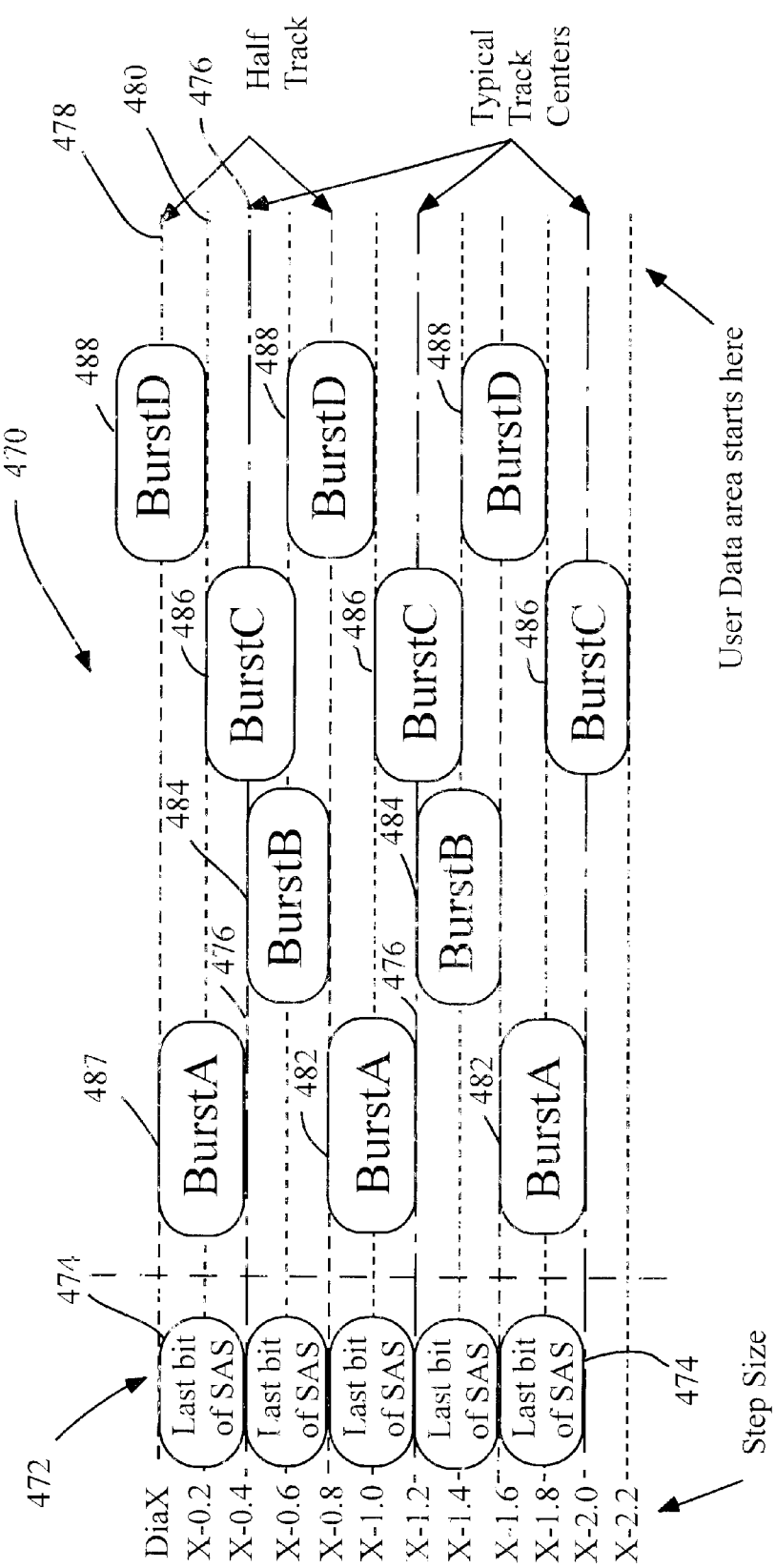
FIG. 16 is a schematic illustration of a preferred servo burst sector with servo bursts in a quadrature arrangement in accordance with the invention.

Referring also to FIG. 16, there is shown a portion of a preferred servo burst sector 470 in accordance with the invention wherein a quadrature burst pattern is utilized. As in the other drawings described above, the relative sizes and distances shown in FIG. 16 are not necessarily to scale. Servo burst sector 470 is shown with a portion of a servo address sector 472 at one edge, with the last bits 474 of servo address sector 472 shown. Servo burst sector 470 is shown with track center lines 476, half track lines 478 and quarter track lines 480. Servo burst sector 470 preferably includes a plurality of "A" servo bursts 482 which are each positioned or offset by plus ninety degrees from their respective track center lines 476. Servo burst sector 470 also preferably includes a plurality of "B" servo bursts 484 which are spaced apart along centerlines 476 from "A" bursts 482 and which are positioned or offset by minus ninety degrees from their respective centerlines 476, and such that the "B" servo bursts 484 are offset by one hundred and eighty degrees from "A" servo bursts 482. Servo burst sector 470 also preferably includes a plurality of "C" servo bursts 486 which are spaced apart along centerlines 476 from the "B" servo bursts 484, with "C" servo bursts 486 positioned at zero degrees (no offset) with respect to center lines 476, and with "C" servo bursts 486 offset by plus ninety degrees from the "B" servo bursts 484. Servo burst sector 470 further preferably includes a plurality of "D" servo bursts 488 which are spaced apart from "C" servo bursts 486 along centerline 476, with "D" bursts 488 being positioned or offset from centerlines 476 by one hundred and eighty degrees, and positioned or offset with respect to "C" bursts by one hundred and eighty degrees.

The servo burst sector 470 may be utilized for embossed servo burst sectors 452 in dedicated servo layer 442, as well as for embedded servo burst sectors 466. Bursts 482, 484, 486, 488 have a different reflectivity than the surrounding portion of burst sector 470. The difference in reflectivity can be introduced by embossing in the case of dedicated servo layer 442, or by inducing a phase change in the read-write material layer of a data stack using the focused read-write beam under writing conditions.

As a focused beam focus (not shown) follows along a track centerline 476, it will experience differing levels of reflectivity as the beam focus point passes the different servo bursts 482, 484, 486, 488. For example, the "C" bursts 486 are positioned on the track centerlines 476, and will provide a relatively large, centered reflectivity. The "A" bursts 482, which are offset by plus 90° from centerlines 476, will provide a positive deflection to the beam spot reflection, and the "B" bursts 484, which are offset by minus 90° from centerlines 476, will correspondingly provide a negative deflection to the reflected beam spot. The "C" and "D" bursts 486, 488 likewise induce deflections in the reflected beam spot which are proportional to their offsets or offset angles from the centerline 476 of the data track. The detector output signal associated with servo bursts will provide a generally sinusoidal electric signal with amplitude differences that are indicative of the deflection of the beam spot by the servo bursts. The detector output signal is demodulated to indicate tracking (or focus) errors which may occur with respect to the position of the beam spot. The tracking and focus error signals, generated according to deflection of the beam spot from servo bursts 482, 484, 486, 488, are used by the dedicated and embedded servo systems for making appropriate focus and tracking error correction by translation of movable lenses, as described above. Numerous methods for deriving tracking and focus error correction information from detector output signals are well known in the art, and need not be described herein.

The quadrature pattern of servo burst sector 470 advantageously provides for correction of wobble or tilt associated with optical disk 440. The interchange of disks in a disk drive tends to introduce different wobble and angle considerations for each disk. Tilt or wobble in a disk generally will cause light deflection in one direction according to the tilt of the disk, and appear as an off-track error in detector output. Thus, accounting for the wobble or tilt in a disk is an important consideration. A wobble pattern will introduce a constant amount of beam spot deflection which can be determined from the quadrature pattern and distinguished from a true tracking error. In this regard, the 180° offset "A" bursts 482 and "B" bursts 486 are used to derive a difference signal "A" minus "B" (A–B) from which any deflection associated with disk tip or wobble is canceled out. The "C" and "D" bursts 486, 488, which are also offset from each other by 180°, can similarly be used to provide another difference signal (C–D) to account for disk wobble.

The quadrature-patterned servo burst sector 470 of FIG. 16 is shown generally as a tracking offset servo burst sector, wherein the servo bursts 482, 484, 486, 488 are laterally offset from each other with respect to centerlines 476, to provide tracking error signals. The quadrature pattern may also be utilized with focus servo bursts by offsetting the servo bursts axially (by depth) rather than laterally, to provide focus error signals. The servo burst sector may be embossed onto dedicated servo layer 442 for use by the dedicated servo system of the invention, or may be embedded or recorded within the data stacks 454 for use by the embedded servo system of the invention. The use of dual focus error signal detectors in association with the reflection of read-write beam off the data. stacks eliminates the need for focus servo bursts within the data stacks. The servo bursts in FIG. 16 are shown as configured for generation of DC servo signals, but may alternatively be configured for AC signal generation. The use of AC servo bursts offers the advantage of using of AC coupler, but additional disk space will generally be required for AC configured servo bursts.

Figure 17:
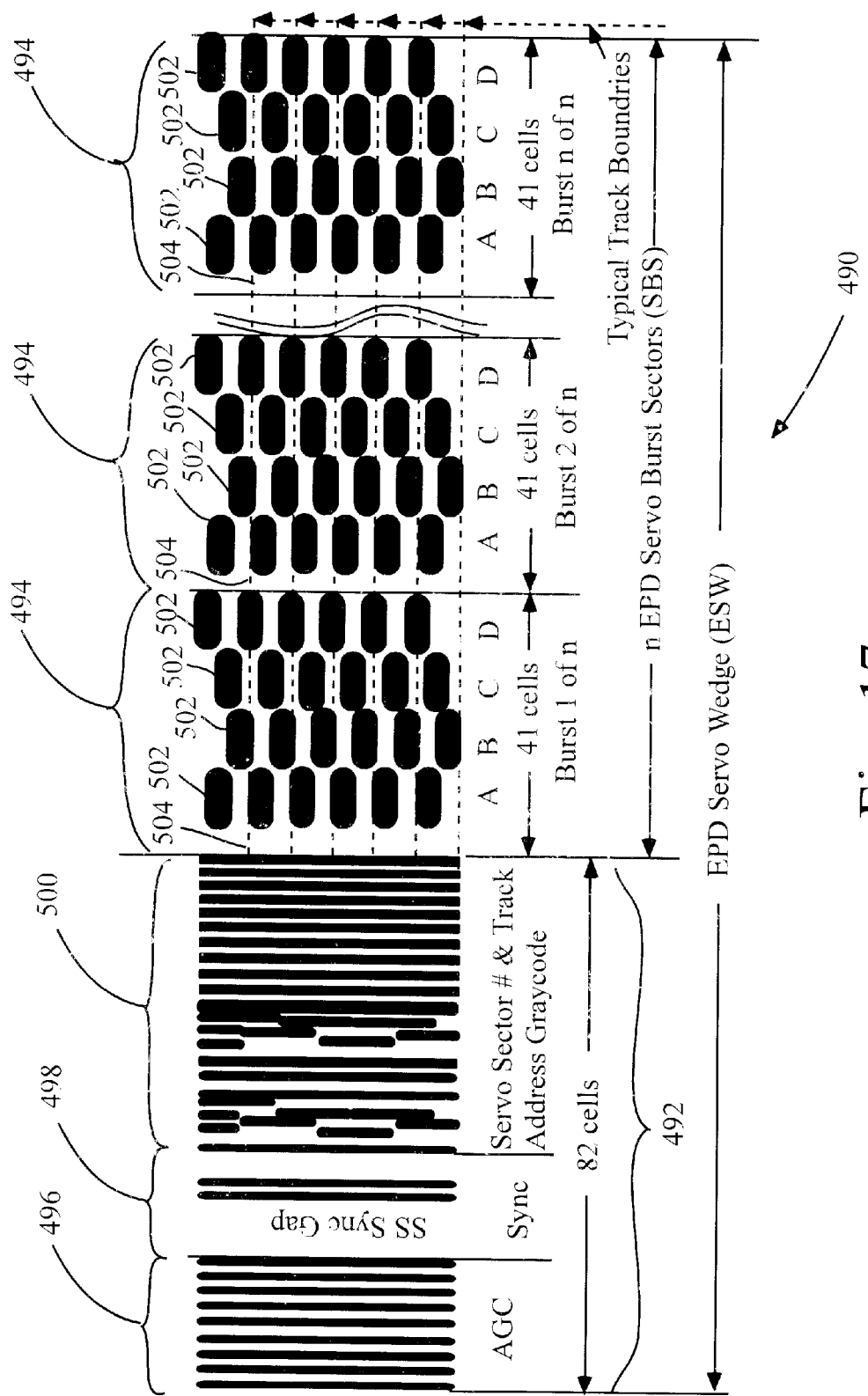
FIG. 17 is a schematic illustration of a preferred servo field for the dedicated servo layer.
Figure 18:
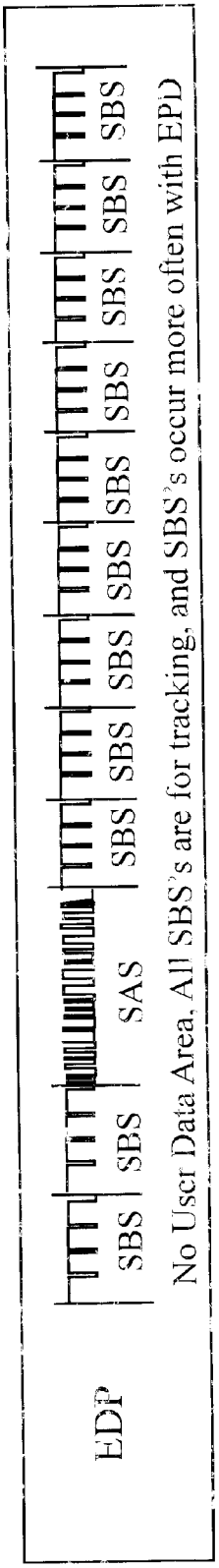
FIG. 18 is a schematic illustration of the readout signal from the servo field of FIG. 17.

Referring now to FIG. 17, there is shown one preferred servo wedge pattern 490 for the dedicated servo layer 442 of disk 440. Servo wedge 490 includes a servo address sector 492 and a plurality of servo burst sectors 494. The servo address sector 494 includes an automatic gain control section (AGC) 496, a sync gap section 498, and a servo sector and track address graycode section 500. Numerous configuration for AGC, sync gap and servo sector and track address graycode sections 496, 498, 500 are well known in the art and are not described in detail herein. The arrangement of servo address sector 492 shown in FIG. 17 is only exemplary. The servo burst sectors 494 each preferably include a plurality of servo bursts 502 arranged in a quadrature pattern, with the bursts 502 being offset from each other and from track centerlines 504 in the manner described above for FIG. 16. The number of servo burst sectors 494, bursts 502 per sector 494, and cells per sector 494 may vary as required for different uses of disk 440. While servo burst sectors 494 are shown generally with tracking servo bursts, it should be understood that a portion of servo bursts sectors 494 may comprise focus servo bursts (with axial or depth offsets). FIG. 18 shows a detector readout signal for the servo wedge 490of FIG. 18.

Figure 20:
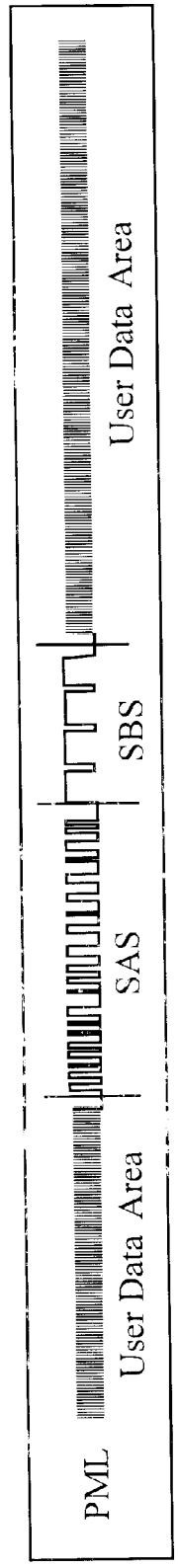
FIG. 20 is a schematic illustration of the readout signal from the servo field of FIG. 19.
Figure 19:
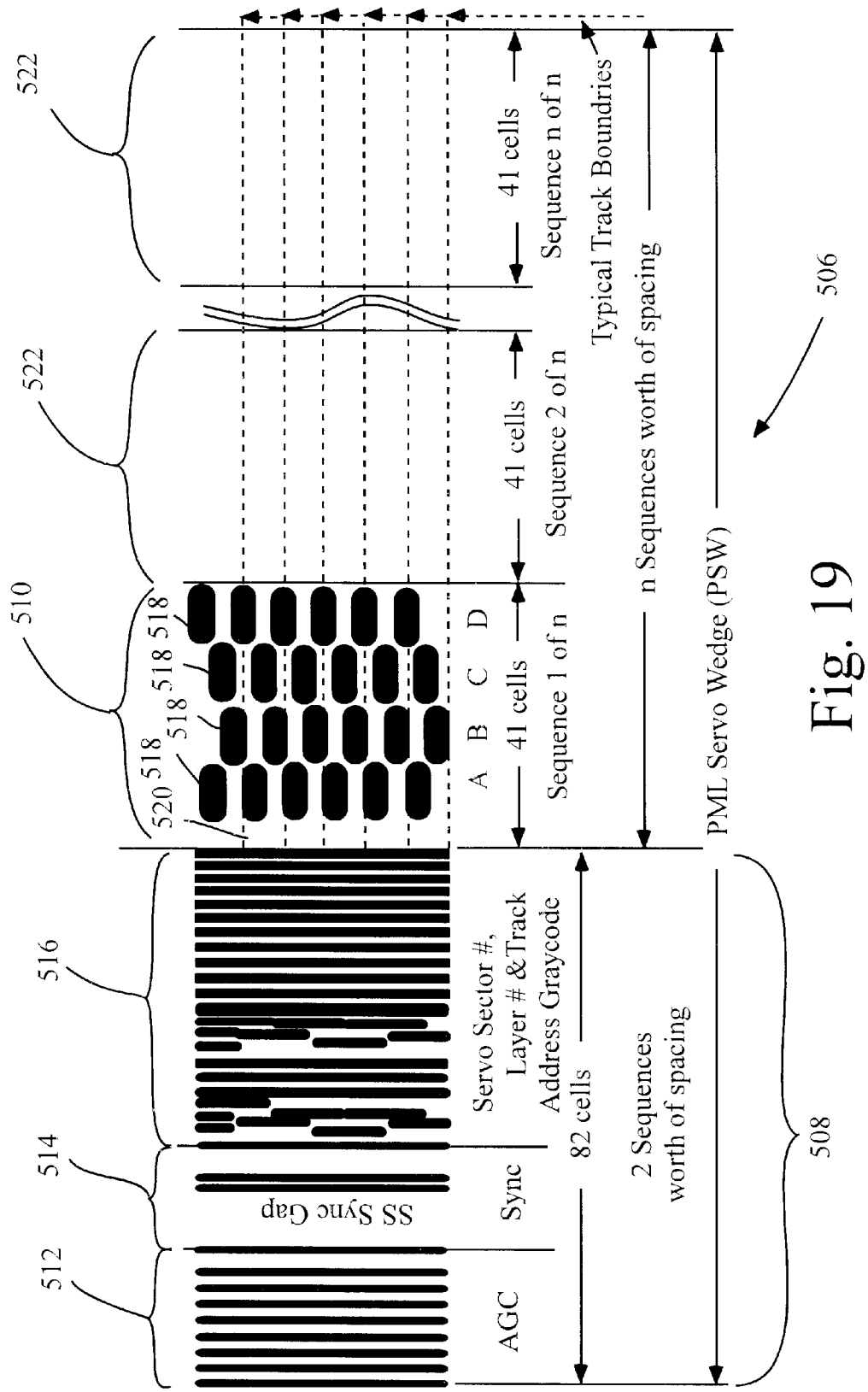
FIG. 19 is a schematic illustration of a preferred servo field for a data stack.
Figure 21:
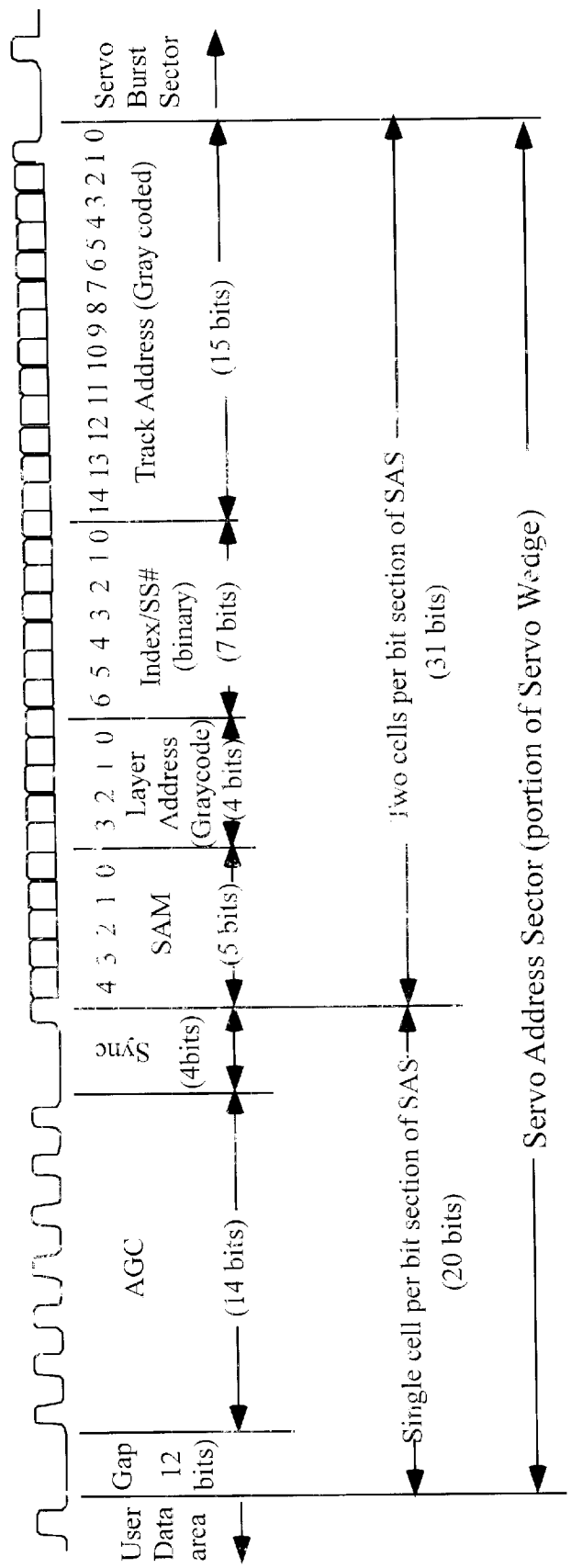
FIG. 21 is a schematic illustration of the readout signal from servo address sector portion of the servo fields of FIG. 17 and FIG. 19.

Referring to FIG. 19, there is shown a preferred servo wedge pattern 506 as used for the embedded servo information of data stack 454. Servo wedge 506 preferably includes a servo address sector 508 and at least one servo burst sector 510. Servo address sector 508 includes an AGC section 512, a sync gap section 514 and a servo sector, layer and track address graycode section 516. Servo burst sector 510 includes servo bursts 518 arranged in quadrature and offset from each other and centerline 520 in the manner described above. As noted above, focus servo burst sectors are not generally required in the data stacks 454, which provides additional space for additional data storage regions 522 and higher overall storage capacity. FIG. 20 shows a detector readout signal for the servo wedge 506 and data regions 522 of FIG. 19. FIG. 21 shows the readout signal for the servo address sector 508 of FIG. 19.

Figure 22:
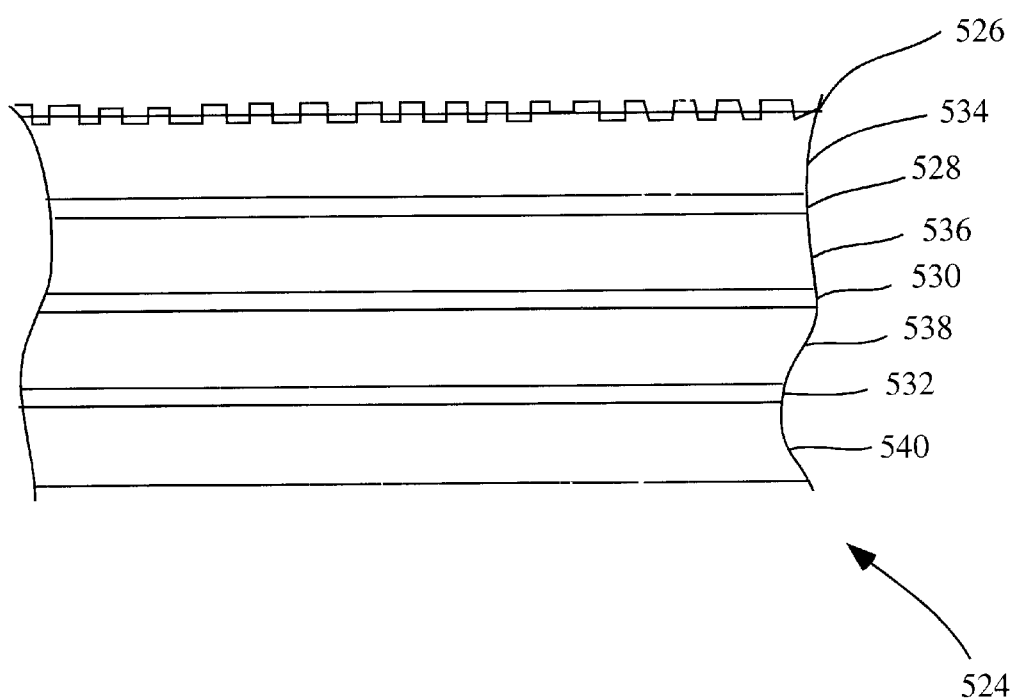
FIG. 22 is a schematic cross-sectional view of a fifth embodiment optical medium in accordance with the invention wherein the dedicated servo layer is positioned on top of the data stacks.

Referring now to FIG. 22, there is shown yet another optical medium 524 in accordance with the invention. The optical medium 524 includes a dedicated or embossed servo layer 526 which is positioned above or on top of a plurality of data stacks 528, 530, 532. The uppermost data stack 528 is separated from dedicated servo layer 526 by a spacer layer 534, while spacer layer 536 separates data stacks 538, 530 and spacer layer 538 separates data stacks 530, 532. An additional data stack may be included beneath spacer 540. In the optical medium 526, the servo beam (not shown) does not need to pass through the several data stacks 528, 530, 532 in order to focus onto dedicated servo layer 526, and the stacks 528 may be designed with consideration for transmission of the read-write beam only. In other embodiments of the invention, dedicated servo layer 526 may be positioned between certain of the data stacks 528, 530, 532, rather than on top of the data stacks as shown in FIG. 22. It is further contemplated that each data stack 528, 530, 532 may include its own dedicated servo layer, rather than just a single dedicated servo layer as shown in FIG. 22.

Figure 23A:
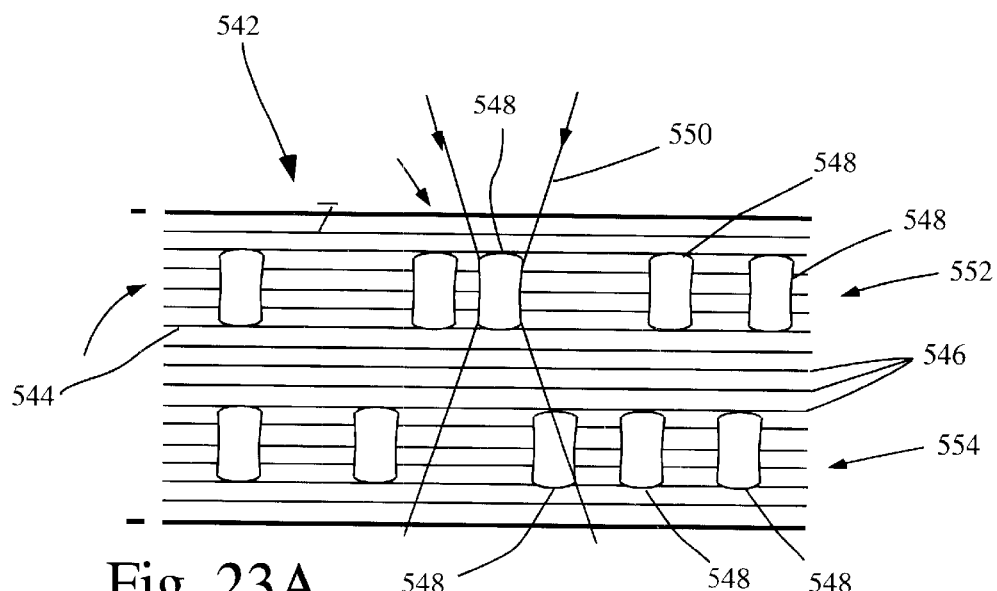
FIG. 23A is a schematic cross-sectional view of a sixth embodiment optical medium in accordance with the present invention wherein virtual data layers are defined by a format hologram having localized alterations written in each data layer.

Referring to FIG. 23A, there is shown still another optical medium 542 in accordance with the present invention. The optical medium 542 utilizes "virtual "data stacks or layers which are defined by a format hologram 544 which is stored or recorded within medium 542. Format hologram 544 includes a plurality of axially spaced apart fringes 546. Data is written in optical medium by forming local alterations or deletions 548 in the format hologram with a focused read-write beam 550. Alterations 548 may be arranged in axially spaced apart rows 552, 554 which define "virtual" data stacks.

Figure 23B:
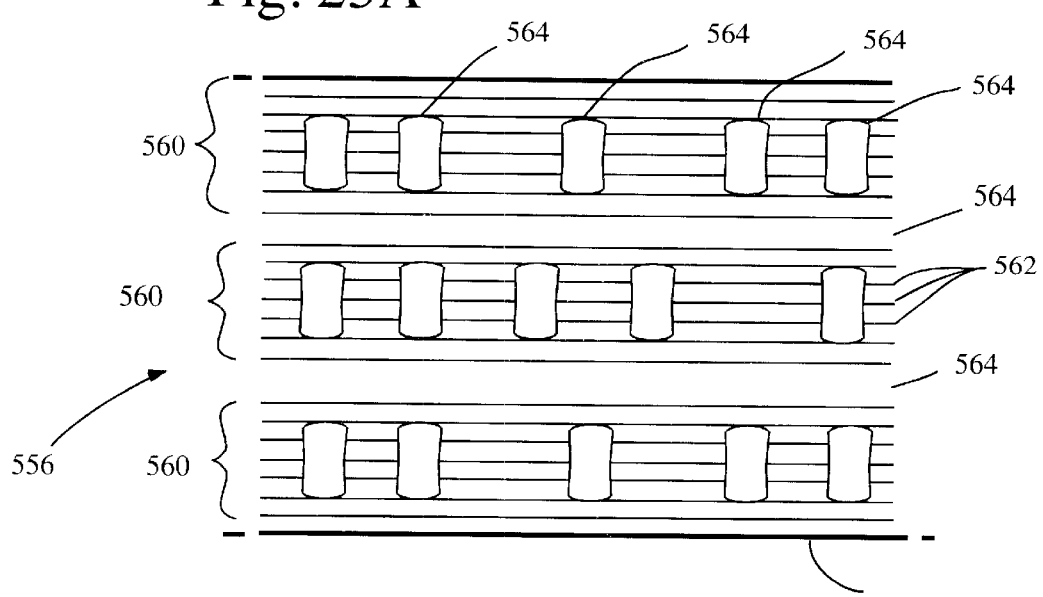
FIG. 23B is a cross-sectional view of a seventh embodiment of an optical medium in accordance with the invention wherein virtual data layers are define by the fringe pattern of a format hologram.

Referring to FIG. 23B there is shown another optical medium 556 having a format hologram 558 stored therein. Format hologram 558 defines distinct storage subvolumes 560 having relatively intense fringes 562, which are axially separated from each other by regions 562 having no or few fringes. The storage subvolumes 560 include localized alterations or deletions 564 written therein, and define "virtual" data stacks. The formation of format holograms in optical media and the storage of data therein by localized alteration of the format holograms are described in additional detail in U.S. patent application Ser. No. 09/016,382, "Optical Data Storage By Selective Localized Alteration of a Format Hologram", by Hesselink et al. filed on Jan. 30, 1998, the disclosure of which is incorporated herein by reference. The optical media 542, 556 will generally utilize a dedicated servo layer and dye layers (not shown) where appropriate. Some preferred arrangements of a dedicated servo layer with virtual data stacks are disclosed in U.S. Provisional Patent Application Ser. No. 60/146,415 entitled "Optical Focus and Tracking Error Detection System", to Ferrier et al. and filed on Jul. 29, 1999, the disclosure of which is also incorporated herein by reference.

Accordingly, it will be seen that this invention provides an optical data storage system and method which uses optical media with multiple data stacks to provide high areal storage densities. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An optical data storage system, comprising:
   (a) an optical medium including a dedicated servo layer and a plurality of data stacks, wherein each said data stack in said optical medium comprises at least two dielectric layers and a read-write material layer, said read-write material layer positioned between said dielectric layers;
   (b) a first laser positioned to address said dedicated servo layer with a first focus spot;
   (c) a second laser positioned to address said plurality of data stacks with a second focus spot;
   (d) a first servo system associated with said first laser and configured to provide focus and tracking error correction according to servo information associated with said dedicated servo layer; and
   (e) a second servo system associated with said second laser and configured to provide focus and tracking error correction according to servo information associated with said data stacks.

2. The optical data storage system of claim 1, wherein said servo information associated with said dedicated servo layer comprises at least one embossed servo burst sector, said embossed servo burst sector including a plurality of servo bursts, said plurality of servo bursts positioned in a quadrature arrangement.

3. The optical data storage system of claim 1, wherein said optical medium further comprises a plurality of spacer layers, said spacer layers and said data stacks being interleaved such that one said spacer layer is positioned between adjacent ones of said data stacks.

4. The optical data storage system of claim 2, wherein said plurality of data stacks in said optical medium comprises an innermost data stack proximate to said dedicated servo layer, and at least one outer data stack.

5. The optical data storage system of claim 4, wherein said read-write material layer in said innermost data stack is thicker than said read-write material layer in said outer data stack.

6. The optical data storage system of claim 5, wherein:
   (a) said dielectric layers in said outer data stack are structured and configured as thin film interference filters which minimize electric field strength and match optical admittance for light from said second laser in said outer data stack; and
   (b) said dielectric layers in said innermost data stack are structured and configured as thin film interference filters which maximize electric field strength and match optical admittance for said light from said second laser in said innermost data: stack.

7. The optical data storage system of claim 3, wherein each said spacer layer has a thickness which is greater than a distance defined by axial intensity lobes associated with said second focus spot when said second focus spot is positioned in one of said data stacks.

8. The optical data storage system of claim 6, wherein said innermost data stack further comprises a reflective metal layer, said reflective metal layer positioned adjacent an outermost one of said dielectric layers, said reflective metal layer configured as an antireflection coating for light from said first laser.

9. The optical data storage system of claim 4, wherein said outer data stack comprises:
   (a) an outer dielectric stack comprising first and second dielectric layers, said first dielectric layer comprising a material having a first refractive index, said second dielectric layer comprising a material having a second refractive index, said first refractive index being less than said second refractive index;
   (b) an inner dielectric stack comprising first and second dielectric layers, said first dielectric layer comprising a material having a third refractive index, said second dielectric layer comprising said material having a fourth refractive index, said third refractive index being greater than said fourth refractive index; and
   (c) said read-write material layer positioned between said outer dielectric stack and said inner dielectric stack.

10. The optical data storage system of claim 9, wherein said read-write material layer in said innermost data stack is thicker than said read-write material layer in said outermost data stack.

11. The optical data storage system of claim 9, wherein said first refractive index and said fourth refractive index are the same, and wherein said second refractive index and said third refractive index are the same.

12. The optical data storage system of claim 10, wherein:
   (a) said outer and inner dielectric stacks in said outer data stack are structured and configured as thin film interference filters which minimize electric field strength and match optical admittance for light from said second laser in said outer data stack; and
   (b) said outer and inner dielectric stacks in said innermost data stack are structured and configured as thin film interference filters which maximize electric field strength and match optical absorption for said light from said second laser in said innermost data stack.

13. The optical data storage system of claim 12, wherein said innermost data stack further comprises a reflective metal layer, said reflective metal layer positioned adjacent said outer dielectric stack, said reflective metal layer configured as an antireflection coating for from said first laser.

14. The optical data storage system of claim 1, wherein said first laser generates a first laser beam having a first wavelength, and said second laser generates a second laser beam having a second wavelength.

15. The optical data storage system of claim 14, further comprising a first movable lens, said first movable lens positioned so that said first and second laser beams pass through said first movable lens, said first movable lens configured to axially separate said first focus spot and said second focus spot when said first and second laser beams are focused on said optical medium.

16. The optical data storage system of claim 15, further comprising a second movable lens, said first laser beam passing through said second movable lens before said first beam passes through said first movable lens.

17. The optical data storage system of claim 16, further comprising a first detector element positioned to detect reflection of said first laser beam from said dedicated servo layer in said optical medium.

18. The optical data storage system of claim 16, further comprising:
   (a) a first focus error signal detectors positioned to detect reflection of said second laser beam from one of said data stacks in said optical medium, said first focus error signal detector including a first pinhole positioned in front of a first focus point in said reflection of said second laser beam;
   (b) a second focus error signal detectors positioned to detect said reflection of said second laser beam from said one of said data stacks in said optical medium, said second focus error signal detector including a second pinhole positioned behind a second focus point in said reflection of said second laser beam; and
   (c) a data detector positioned to detect said reflection of said second laser beam from said one of said data stacks in said optical medium.

19. The optical data storage system of claim 16, further comprising:
   (a) a diffractive optical element positioned to receive reflection of said second laser beam from one of said data stacks in said optical medium, said diffractive optical element configured to generated first, second and third diffracted beams from said reflection of said second laser beam, said first, second and third diffracted beams having respectively a first focus point, a second focus point and a third focus point;
   (b) a pinhole array including first, second and third pinholes, said pinholes lying within a plane which is substantially normal to optical axes defined by said first, second and third diffracted beams, said first focus point being positioned in front of said plane, said second focus point lying within said plane, and said third focus point positioned behind said plane;
   (c) first, second and third detectors, said first, second and third detectors respectively positioned behind said first, second and third pinholes.

20. The optical data storage system of claim 19, wherein said first, second and third diffracted beams comprise a minus first order diffraction, a zeroth order diffraction, and a plus first order diffraction.

21. The optical data storage system of claim 1, wherein said servo information associated with said data stacks comprises at least one embedded servo burst sector located in at least one said data stack, said embedded servo burst sector including a plurality of servo bursts, said plurality of servo bursts positioned in a quadrature arrangement.

22. The optical data storage system of claim 21, wherein said servo burst sector is a tracking servo burst sector.

23. The optical data storage system of claim 21, wherein said servo burst sector comprises first, second, third and fourth servo bursts, said first servo burst offset from a track centerline by ninety degrees, said second servo burst offset from said first servo burst by one hundred and eighty degrees, said third servo burst positioned on said track centerline, said fourth servo burst offset from said third servo burst by one hundred and eighty degrees.

24. The optical data storage system of claim 16, wherein said first servo system comprises:
   (a) a first servo demodulator configured to generate focus error signals and tracking error signals according to embossed servo information on said dedicated servo layer;
   (b) a first servo control processor configured to generate focus error correction signals and tracking error correction signals according to said focus error signals and said tracking error signals from said first servo demodulator; and
   (c) at least one optical actuator which is positioned to translate at least one of said movable lenses, said first servo control system configured to translate said movable lens 25. The optical data storage system of claim 24, wherein said second servo system comprises:
   (a) a second servo demodulator configured to generate focus error signals and tracking error signals according to embedded servo information in said data stacks;
   (b) a second servo control processor configured to generate tracking error correction signals according to said tracking error signals from said second servo demodulator; and
   (c) at least one optical actuator which is positioned to translate at least one of said movable lenses, said second servo control system configured to translate said movable lens.

* * * * *

UNITED STATES PATENT AND TRADEMARK OFFICE
CERTIFICATE OF CORRECTION

PATENT NO. : 6,574,174 B1 Page 1 of 1
DATED : June 3, 2003
INVENTOR(S) : Amble et al.

It is certified that error appears in the above-identified patent and that said Letters Patent is hereby corrected as shown below:

Title page,
Item [75], Inventors, delete "Lambrerrtus" and replace thereof with -- Lambertus -- after "(US);" and before "Hesselink,";
delete "Tokyuki" and replace thereof with -- Tokuyuki-- after "Atherton, CA (US);" and before "Honda,"

Column 36,
Line 3, delete ":" between -- in said innermost data -- and -- stack. --

Signed and Sealed this

Thirteenth Day of April, 2004

JON W. DUDAS
*Acting Director of the United States Patent and Trademark Office*